(12) United States Patent
Kirsch

(10) Patent No.: US 10,567,674 B2
(45) Date of Patent: Feb. 18, 2020

(54) SYSTEMS AND METHODS FOR DETECTING OBJECTS IN IMAGING SYSTEMS

(71) Applicant: Harman International Industries, Incorporated, Stamford, CT (US)

(72) Inventor: James M. Kirsch, Salt Lake City, UT (US)

(73) Assignee: Harman International Industries, Incorporated, Stamford, CT (US)

( * ) Notice: Subject to any disclaimer, the term of this patent is extended or adjusted under 35 U.S.C. 154(b) by 180 days.

(21) Appl. No.: 15/639,771

(22) Filed: Jun. 30, 2017

(65) Prior Publication Data

US 2019/0007626 A1 Jan. 3, 2019

(51) Int. Cl.

| B60R 1/00 | (2006.01) |
|---|---|
| H04N 5/265 | (2006.01) |
| G06K 9/00 | (2006.01) |
| G06T 7/13 | (2017.01) |
| G06K 9/46 | (2006.01) |
| B60K 35/00 | (2006.01) |

(52) U.S. Cl.
CPC ............. *H04N 5/265* (2013.01); *B60K 35/00* (2013.01); *B60R 1/00* (2013.01); *G06K 9/00805* (2013.01); *G06K 9/4604* (2013.01); *G06T 7/13* (2017.01); *B60K 2370/188* (2019.05); *B60K 2370/21* (2019.05); *B60K 2370/52* (2019.05); *B60R 2300/30* (2013.01)

(58) Field of Classification Search
CPC .......... H04N 5/265; G06T 7/13; B60K 35/00; B60K 2350/2008; B60K 2350/2013; B60K 2350/352; G06K 9/00805; G06K 9/4604; B60R 2300/30

USPC ......................................................... 348/148
See application file for complete search history.

(56) References Cited

U.S. PATENT DOCUMENTS

| 2017/0120829 A1* | 5/2017 | Hasegawa ............ H04N 5/2351 |
| 2017/0269684 A1* | 9/2017 | Murai ....................... B60R 1/00 |
| 2018/0301122 A1* | 10/2018 | Katsuyama ............. G06F 3/147 |

OTHER PUBLICATIONS

Palak Kumar, Vineet Saini, "An Efficient Image Sharpening Filter for Enhancing Edge Detection Techniques for 2D, High Definition and Linearly Blurred Images", International Journal of Scientific Research in Computer Science and Engineering, vol. 2, No. 1, 2014 (Year: 2014).*

* cited by examiner

*Primary Examiner* — Ayman A Abaza
(74) *Attorney, Agent, or Firm* — McCoy Russell LLP

(57) ABSTRACT

Systems and methods for detecting objects in imaging systems are provided. An example method includes, during an image composition process for capturing an image of an object using an image sensor of the imaging system, and responsive to an indication that an intensity of glare light interfering with the imaging system is higher than a threshold, acquiring a first image using the image sensor, converting the first image into at least a second image, the second image including an intensity-adjusted version of the first image, intermittently displaying images including the first image and at least the second image on a display of the imaging system, and ceasing the intermittent displaying of the images.

20 Claims, 11 Drawing Sheets

SYSTEMS AND METHODS FOR DETECTING OBJECTS IN IMAGING SYSTEMS

FIELD

The disclosure relates to the field of imaging systems, and in particular to assisting with the detection of objects in a field of view of an imaging system and a composition of an image to be captured by the imaging system in the presence of a bright background light.

BACKGROUND

While capturing images using a camera the presence of a bright background light (e.g., sunlight), the bright light may enter the camera lens causing a glare in a display of the camera, making it difficult for a user to resolve objects on the display. Typically, glare in the display may be reduced by shooting from a different angle (e.g., positioning the camera in between the sun and the object) or by using additional polarizing filters while acquiring the images. However, some opportunities for photographing may not allow the photographer to move in time and/or use additional filters. Consider an example situation wherein a photographer is shooting images during a live outdoor day-time sports event. Scenes may be difficult to compose with handheld cameras (including mobile phones) when the sun is shining toward the camera lens. Further, it may not be possible for the photographer to adjust the position of the camera and/or players on the field relative to the sun's position to avoid glare in the images. In some situations, when the sun behind the photographer, there may be glare in the image viewer and/or display making it difficult to compose the picture.

Glares may also cause issues in images produced by cameras coupled to vehicles, for example. Automotive backup camera images may be difficult to view on an interior vehicle display when the sun is shining toward the camera lens. For example, during sunrise when the car is facing west, or during sunset when the car is facing east, the sun will be in the field of view of the camera. Additionally, images acquired at night where there are many street lights or parking lot lights in the field of view of the automotive camera may lead to glares in the image displayed on the vehicle display.

SUMMARY

Embodiments are disclosed for detecting objects in the presence of glare. An example method includes, during an image composition process for capturing an image of an object using an image sensor of the imaging system, and responsive to an indication that an intensity of glare light interfering with the imaging system is higher than a threshold, acquiring a first image using the image sensor, converting the first image into at least a second image, the second image including an intensity-adjusted version of the first image, intermittently displaying images including the first image and at least the second image on a display of the imaging system, and ceasing the intermittent displaying of the images. For example, the first image may be converted into a second and a third image, where the second and third images are inverses of each other. In such an example, the first, second, and third images may be intermittently displayed.

An example in-vehicle computing system of a vehicle includes one or more image sensors configured to image an environment of the vehicle, a display, a processor, and a storage device storing instructions executable by the processor to, responsive to receiving an indication that a light intensity associated with one or more of the image sensor and the display is higher than or equal to a threshold (e.g., via a light sensor, user input, etc.), receive first image data from one or more sensors of the plurality of image sensors and preprocess the first image data to generate at least second image data. The instructions are further executable to generate a series of images using the first image data and at least the second image data, intermittently display the series of images for a threshold time on the display, and cease the intermittent display responsive to a termination trigger (e.g., an expiration of a time period, a user input, a determination that a light intensity has dropped below the threshold, etc.).

Another example in-vehicle computing system includes a display, a camera interface communicatively coupled to at least one camera mounted on the vehicle, a sensor interface communicatively coupled to a light sensor, a processor, and a storage device storing instructions executable by the processor to: detect, based on data received from the light sensor, a light intensity in a vicinity of the vehicle being higher than a threshold, and responsive to detecting the light intensity being higher than the threshold, receive a first image from the at least one camera, adjust one or more of a color distribution and a light intensity distribution of the first image to generate at least a second image, and intermittently flicker the first image and the second image on the display.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
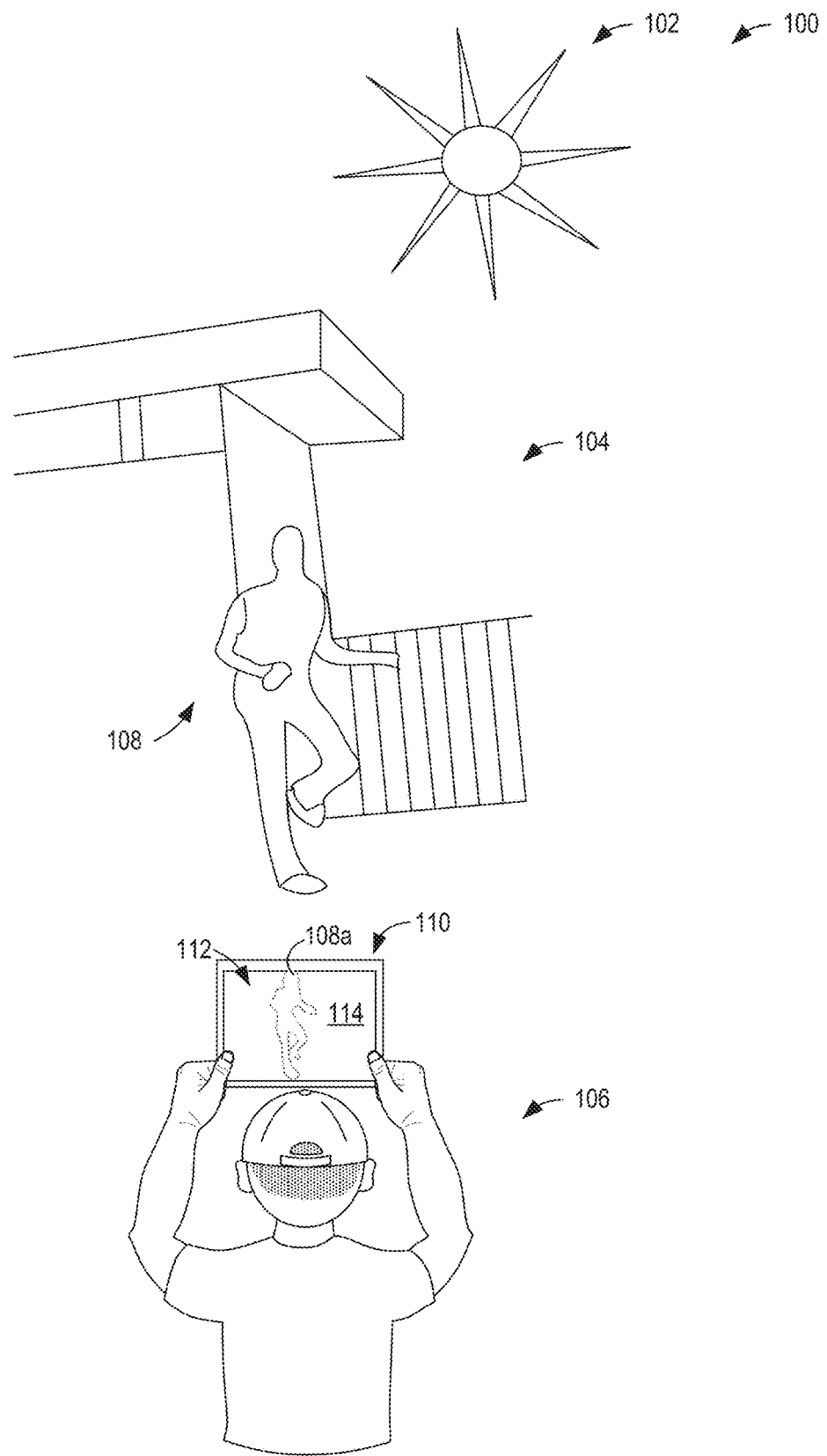
FIG. 1 shows an example scenario depicting how glare may occur while imaging in the presence of a bright background light.

While composing an image using an imaging system such as a camera, objects in the image may be difficult to see, particularly when there is a glare caused by a bright background light. For example, while acquiring images with handheld cameras (including digital cameras, mobile phones, head mounted displays, and tablets), when the sun is shining toward the camera lens and/or sun is directly shining in the eyes of a user/photographer, the photographer may find it difficult to see objects in the scene and may additionally find it difficult to compose the image. The photographer may be able to reduce glare by adjusting the position of the objects in the scene and/or position of the photographer. For example, the photographer may position himself/herself in between the sun and the objects, with the sun positioned behind the photographer. In this way, the photographer may be able to minimize the amount of sunlight directly impinging on the camera lens and thereby reduce glare. However, in most situations, there may not be an opportunity for the photographer to move and/or re-position objects in time. For example, when the photographer is covering an outdoor soccer match during broad daylight, and the sun is directly in front of the photographer, the photographer may not have the time or the motive to move so that the glare from the sun is reduced. Further, in situations where the sun is behind the photographer, there may be a glare on the image viewer and/or display making it increasingly difficult for the photographer to resolve players/objects in the viewer and/or display. As a result, the photographer may require additional time in composing the scene or in some cases, may even miss photo opportunities.

Glare in images may additionally be an issue in automobile imaging systems. For example, one or more cameras may be mounted to an automobile/vehicle and used to acquire images of the vehicle's environment. Images from the one or more cameras mounted to the vehicle may be used to detect objects in the path of the vehicle, or otherwise assist with driving maneuvers. Images captured by a front- and/or rear-facing camera in direct sunlight (e.g., a rear-facing camera of a vehicle moving westward during sunrise) may be subject to glare caused by the sunlight impinging on the lens of the associated front- and/or rear-facing camera. The images may be displayed to a driver of the vehicle. However, due to glare present at the front-facing camera, the images captured by the front- and/or rear-facing camera may be corrupted or degraded. As a result, the driver may not be able to effectively resolve objects in the environment and/or path of the vehicle from the image, which may affect the driving assistance experience relative to conditions in which glare is not present.

The present disclosure describes systems and methods for object detection which provide outputs to assist a user with resolving objects in an image acquired by an image sensor (e.g., a camera) while acquiring the image in the presence of a bright background light (e.g., the sun). As an example, when there is increased glare while the user is trying to compose an image, to aid the user in resolving the location of objects within the image, the image may be exaggerated and flashed intermittently with the unprocessed image. For example, the exaggerated images may be flickered intermittently with the unprocessed image by displaying the unprocessed image, then displaying one or more exaggerated images intermittently with one another (e.g., according to a slow fade over hundreds of milliseconds), and then displaying the unprocessed image again (or an updated version of the unprocessed image to account for changes in the scene and/or camera position that occurred during the flickering). Some examples of exaggerated images may include images generated by applying one or more of thresholding, edge detection, color augmentation, and object classification via machine learning to the unprocessed image. By flashing or flickering the exaggerated image and the unprocessed image, the user may be able to easily detect the objects in the scene. When the user is cued to selectively focus on flickering images, the user may be able to detect, discriminate, and identify objects in the image in a faster and more accurate manner. Upon detecting the objects, the user may then be able to center the object within a field of view of the image sensor, and proceed to acquire a final image of the object. In this way, objects that would have been otherwise obstructed in the presence of glare, may be detected more accurately.

FIG. 1 shows an example environment 100 including a user 106 of an imaging system 110 attempting to resolve an object 108 in an image 112 in the presence of a bright source of light 102. The source of light 102 may include natural sunlight as well as artificial light such as light from lamps, streetlights, headlights, etc. In example environment 100, the user 106 is attempting to compose the image 112 on a viewer or display 114 while holding the imaging system 110 at a distance in front of the eye of the user 106. As such, the image 112 may represent the scene or portion of the environment 100 that is displayed on the display 114 as the user is composing an image. A non-limiting example of the imaging system 110 may include and/or be communicatively coupled to a camera and a display or viewfinder (e.g., display 114). The image 112 may represent a field of view of the camera, for example. In some examples, the imaging system 110 may include a digital camera, mobile phone, tablet, laptop, and/or any device that is configured with at least one camera capable of capturing an image (e.g., a head mounted display).

In the example environment 100 shown in FIG. 1, the object 108 is depicted as a person. However, the object 108 may include animate and/or inanimate objects, such as animals, people, birds, insects, trees, flowers, cars, houses, and/or any other physical element(s) that is targeted during composition of the image (e.g., to be positioned in a particular region of the image). When the source of light 102 is in front of the imaging system 110, light from the source of light 102 may impinge on a lens (not shown in FIG. 1) of the imaging system 110, causing a glare to appear in the image 112 generated by the imaging system 110. As a result of the glare in the image 112, the user may not be able to see or detect the object 108 within the image 112 (e.g., as indicated by imaged object 108a, which shows the object 108 as imaged by the imaging system and displayed on display 114). Thus, the ability of the user 106 to acquire an image of the object 108 may be hindered in the presence of the source of light 102 above the object 108. Even if the source of light 102 is behind the user 106, for example, the light may still impinge on the display 114 causing a glare on the display 114 which may make it difficult for the user 106 to see the object 108 as presented in the image 112 on the display 114.

As described previously, it may not always be possible to adjust the position of the object 108 and/or the user 106 relative to the source of light 102 in order to reduce glare in the imaging system 110. The present disclosure provides mechanisms for flickering images to locate objects on a display, as described below.

Figure 4:
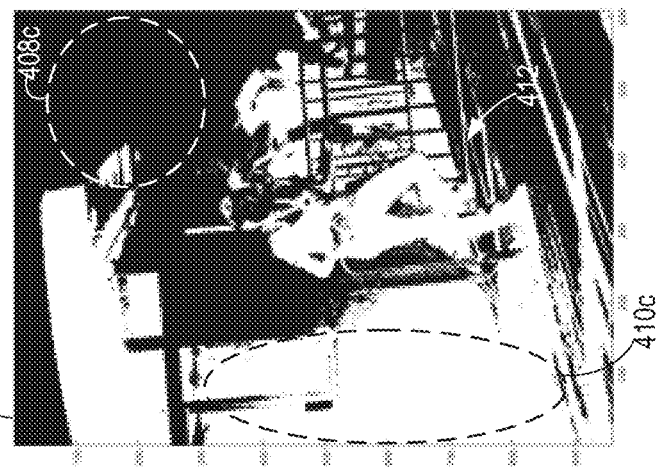
FIG. 4 shows an example scenario where thresholding is applied to image acquired by the image sensor in accordance with one or more embodiments of the present disclosure.
Figure 4:
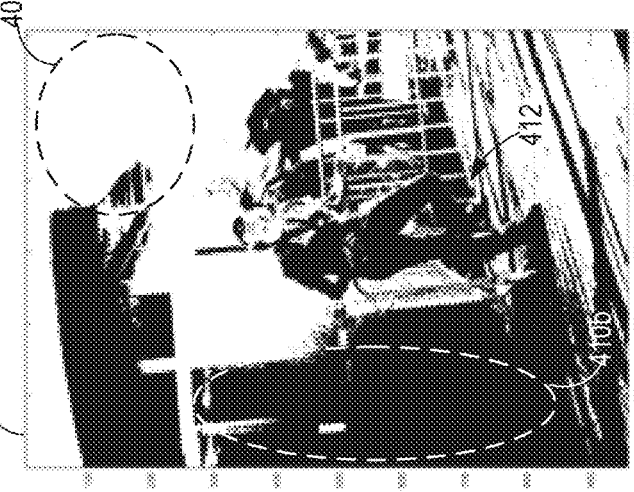
Figure 4:
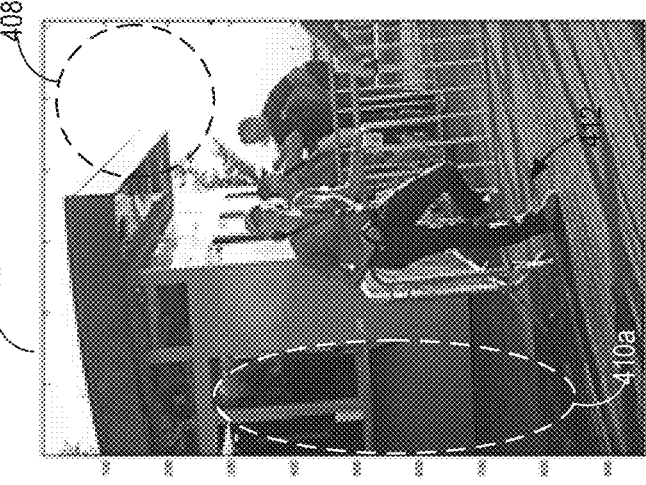
Figure 5:
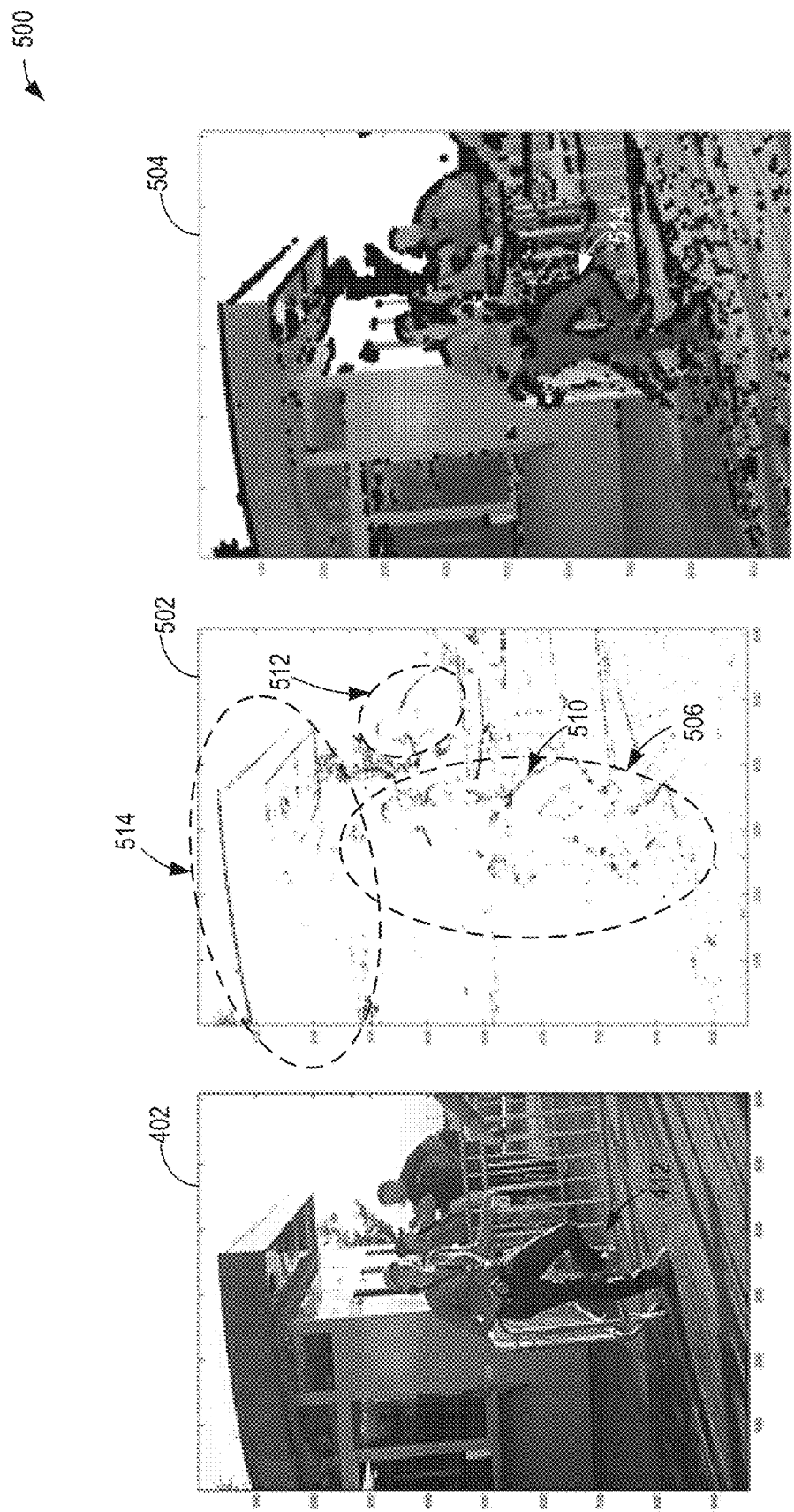
FIG. 5 shown an example scenario where edge detection is used to identify objects in the image acquired by the image sensor in accordance with one or more embodiments of the present disclosure.

While the user is trying to compose an image, a first image may be acquired using the imaging system 110. In one example, the first image may be a temporary image (e.g., not permanently saved in the memory of the imaging system 110, or saved in a designated cache or temporary storage area—such as a cache memory that is regularly erased and/or overwritten during an image capturing session). The first image may then be pre-processed (e.g., sharpened coarsely and quickly) to generate a second image. FIGS. 4-5 show some example techniques that may be applied to sharpen the first image. In one example, the first image may be a color image and the second image may be a grayscale image (or black and white monochromatic image) with increased contrast. In additional or alternative examples, the first image may be a color or greyscale image and the second image may be an intensity-adjusted version of the first image. For example, the first image may be pre-processed to invert, transpose, and/or otherwise adjust a light intensity distribution across the entirety of the first image such that a light intensity and/or hue of at least some of the pixels of the first image is adjusted. Additional details of example adjustments to the first image to generate the second image are described below.

The first and the second image may then be flashed quickly on the display 114. The flashing may help the user 106 to identify and locate the imaged object 108a (the imaged form of object 108) on the display 114. Without the flashing, the imaged object 108a may be obscured by the glare caused in the imaging system 110. However, when the first and the second images are flashed, the attention of the user 106 may be drawn towards the imaged object 108a. In this way, the imaged object 108a may be located within the display of the imaging system 110. Once located, the user may then proceed to center the object 108 in the field of view (e.g., center the imaged object 108a in the display 114) and acquire a final image of the object 108. It may be appreciated that the final image acquired may be stored in the memory of the imaging system 110, while the first image and the second image may be discarded or overwritten (e.g., immediately after capturing and/or storing the final image), as explained further below.

Figure 2:
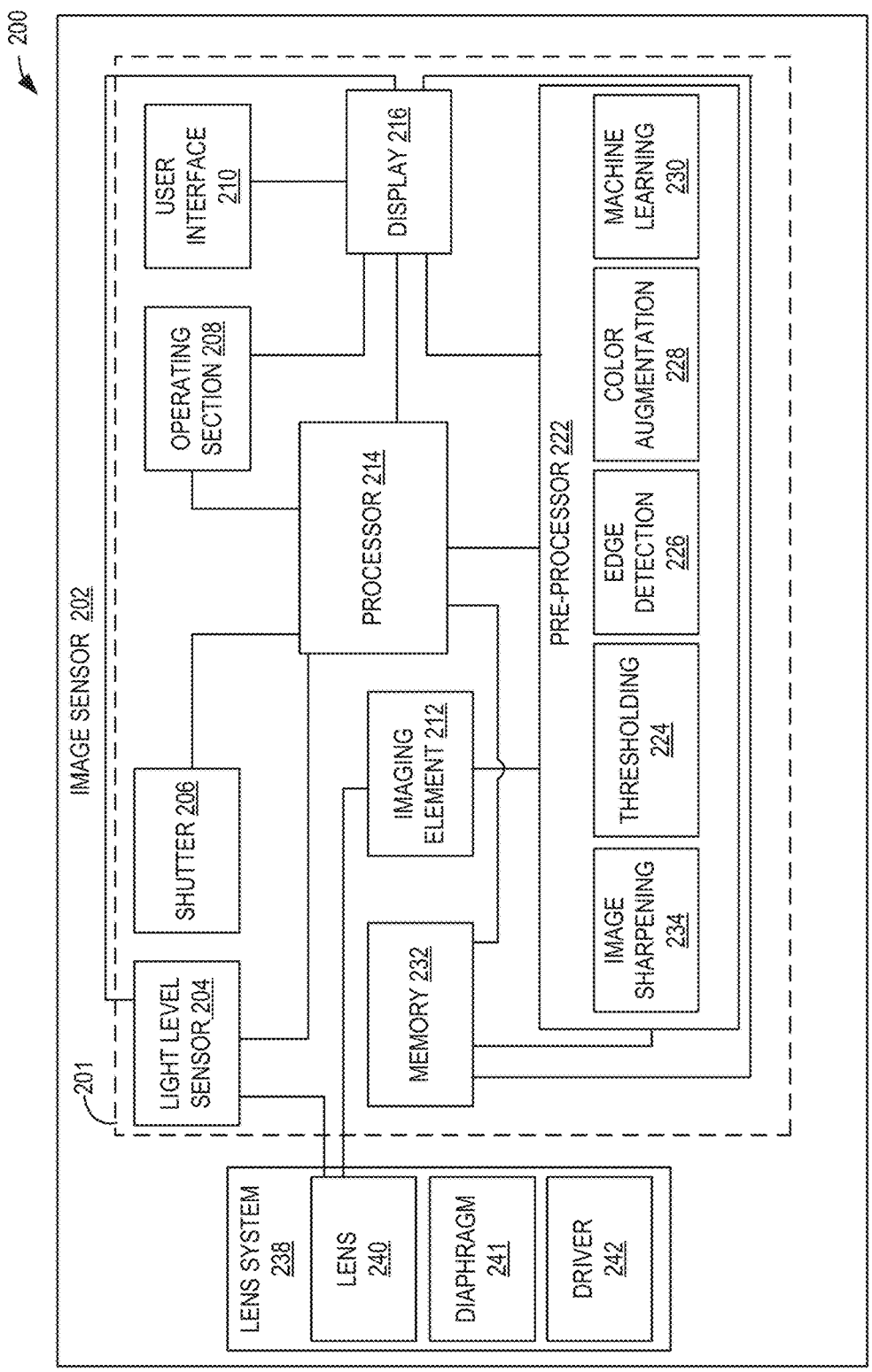
FIG. 2 shows a block diagram of an image sensor in accordance with one or more embodiments of the present disclosure.
Figure 2:
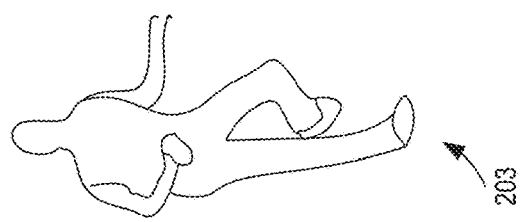

Turning now to FIG. 2, an example block diagram 200 of an image sensor 202 is shown. The image sensor 202 may be one non-limiting example of the imaging system 110 of FIG. 1. Some examples of the image sensor 202 include a camera and/or any device that is configured with at least a camera, such as a mobile phone, a tablet, head-mounted displays, a laptop, etc. In one example embodiment, the image sensor 202 may be an example of a camera mounted to a vehicle as described with reference to FIGS. 7-11, further below.

The image sensor 202 may include a main body 201 and a lens system 238. The lens system 238 may include photographing lens 240, a diaphragm 241, and a driver 242. In one example, the lens 240 may be an interchangeable lens that is attachable to and detachable from the main body 201. In some example embodiments, where the image sensor is a mobile phone, the main body may be the body of the phone. In some examples, the lens 240 may be fixed permanently to the main body 201. As such, the lens system 238 may be an optical lens or assembly of lenses used in conjunction with the body 201 to image an object 203 and is capable of capturing and/or storing an image of the object chemically or electronically. The lens system 238 may additionally include a processor, a memory, and an interface which are not shown in FIG. 2 (e.g., other than the processor, memory, and interface which are shown as being included in the body 201 and described in more detail below). The driver 242 may adjust an opening of the diaphragm 241 to adjust an amount of light passing from the object 203 and/or environment into the lens 240. The driver 242 may additionally or optionally adjust a focal length of the lens 240. As such, optical information such as focal distance, position of lens, and an aperture values may be relayed from the lens system 238 to the main body 201 via an interface coupling the lens system to the main body 201.

The camera main body 201 includes a shutter 206, an operating section 208, a user interface 210, an imaging element 212, a processor 214, a pre-processor 222, a display 216, and a memory 232. The shutter 206 may be a mechanical shutter or an electronic shutter configured to adjust an amount of luminous flux impinging on the imaging element from one or more of the object 203 and the ambient environment. Optional additional drivers (not shown in FIG. 2) may be used to open and close the shutter 206 based on a control signal from the processor 214.

In some example embodiments, the main body 201 may include a light level sensor 204 to detect the light entering the lens system 238 and/or to detect the light level on the display 216. The light level sensor 204 may be an ambient light sensor that detects the ambient light or illuminance at or near one or more of the lens 240, the object 203, and the display 216. In some examples, separate and distinct light level sensors may be used to determine the light level of each of the lens system, main body, and display. Based on the light levels detected by the light levels sensor 204, the processor 214 may activate a pre-processor 222 for applying image sharpening filters as described further below.

The operating section 208 may include various operating buttons such as a power source button, a release button, a moving image button, a reproduction button, and a menu button. In one example, the operating section may include a touch panel. A user of the image sensor 202 may be able to navigate the operating buttons described above using the touch panel in such an example. For example, by using the operating section, the user may be able to select a photographing mode (e.g., still image mode, moving image mode), save an image (e.g., in memory 232), retrieve an image stored in memory 232, and additionally display the retrieved image on display 216. Each of the above selections may be made via actuation of an associated element of the operating section 208 (e.g., a location on a touch panel, a particular button or series of button presses, etc.).

The imaging element 212 may include imaging pixels that acquire an image of the object 203 to be recorded or displayed. In some examples, the imaging element 212 may be positioned along an optic axis of the lens 240 behind the shutter 206 and at a position where the luminous flux is formed into the image by the photographing lens 240. The imaging element 212 may be formed using photodiodes constituting the imaging pixels, for example. The image sensor 202 may include additional analog processing elements that apply analog processing to the image signal read from the imaging element 212 and may include AD converters that convert the image signal subjected to the analog processing into a digital type of image signal (the pixel data).

The processor 214 may control the operation of the image sensor 202 in accordance with programs and/or instructions stored in the memory 232. In some examples, the processor 214 may also apply various types of image processing to the image signal to generate image data. For example, the processor 214 may apply image processing for still image recording to generate still image data, when a still image of the object 203 is recorded. Similarly, the processor 214 applies image processing for moving image recording to generate moving image data, when a moving image is recorded. The still and/or moving image data may be stored in the memory 232. The memory 232 may include both non-volatile memory such as a mask ROM or a flash memory and volatile memory such as SDRAM (Synchronous Dynamic Random Access Memory).

In some examples, when there is a glare on one or more of the lens 240, the object 203, and the display 216, the processor 214 may activate the pre-processor 222. Though shown as a separate entity in FIG. 2, it may be appreciated that the pre-processor 222 may be combined with the processor 214 without deviating from the scope of the disclosure. As such, the pre-processor 222 may be activated based on an output of the light level sensor 204. For example, when the output of the light level sensor 204 of the image sensor 202 is above a threshold, a glare at one or more of the lens 240, object 203, and the display 216 may be present, and accordingly, the pre-processor 222 may be activated. The pre-processor 222 may perform processing routine(s) to exaggerate the image acquired by the image sensor 202 and additionally control the display to flash the exaggerated image to help the user to detect the object 203 on the display 216 as explained in detail further below with reference to FIG. 3. Some examples methods that may be applied to the image data to exaggerate or pre-process the image data includes applying techniques such as image sharpening 234, thresholding 224, edge detection 226, color augmentation 228, and object classification via machine learning 230 to the acquired image data, as described below.

Turning now to FIG. 4, view 400 shows a set of images 404 and 406 that have been generated by applying a threshold to a first image 402. Images 404 and 406 may be referred to exaggerated images. Specifically, images 404 and 406 are generated by applying a pre-processing technique (e.g., thresholding) to the image 402. Herein, image 402 may be a raw or unprocessed image. Hereafter, the image 402 (e.g., representing an unprocessed or raw image that provides a substantially live or continuously updated view of a scene to be imaged) may be referred to as the first image and one or more of images 404 and 406 may be referred to as the second image (e.g., representing any processed images that are quickly displayed to assist a user in finding objects in the scene). For example, as will be described below, each of images 404 and 406 may be intermittently displayed after displaying the first image. In such an example, the first image (e.g., a color image of a scene to be captured) may be displayed for a duration, then a white thresholded image (e.g., image 404) is displayed for a short duration (e.g., a shorter duration than used to display the first image), then a black thresholded image (e.g., image 406) is displayed for a short duration (e.g., the same duration as the white thresholded image), and then the first image (e.g., a raw or unprocessed color image of the scene) is displayed again.

As an example, the first image 402 may generated using image data acquired via an image sensor such as the image sensor 202 of FIG. 2 and/or imaging system 110 of FIG. 1. Image 404 may be generated by applying a threshold to the pixels in the first image 402. For example, the pixels with levels below the threshold may be set to black, and the pixels with levels above the threshold may be set to white. As used herein, pixel levels may refer to a luminance or intensity of an associated pixel (e.g., an amount of light that impinges on an associated sensor element of the image sensor and/or an intensity of a pixel of the captured image). In one example embodiment, the threshold may be set as the median level of the first image 402. If the first image 402 is a color image, then the image may be converted into a grayscale or black and white image and then the thresholding may be applied to the generated grayscale or black and white image.

Consider a region 410a and a region 408a of the first image 402. It may be noted that region 410a is darker than the region 408a in image 402. In one example, the threshold may be applied to the first image 402 to generate image 404 such that a region 410b appears blacker in image 404 than associated region 410a of image 402 and region 408b appears whiter in image 404 than associated region 408a of image 402.

In another example, the image 406 may be generated by applying the threshold to the pixels in the first image 402. Herein, pixels whose levels are below the threshold may be set to white, and pixels whose levels are above the threshold may be set to black. Herein, the threshold may be applied to the first image 402 such that the region 410c appears white while region 408c appears black as shown in image 406.

As described previously, the threshold may be calculated as the median level of the first image. In another example, the threshold may be set as the mean of the intensity distribution in the first image. In yet another example, the threshold may be determined as the mean of the maximum intensity, Imax, and the minimum intensity, Imin, values (e.g., threshold T=(Imax+Imin)/2). In still more examples, the threshold T may be selected based on the intensity distribution. For example, if intensity follows a bimodal distribution with a deep and sharp valley between two peaks, then Otus's method may be used to determine the threshold. In such an example, Otus's method may be used to determine a threshold T based on estimates of dispersion and location of intensities. In one example, the threshold T which minimizes the intra-class variance (e.g., maximizes the inter-class variance) may be selected.

If the levels follow a gradient across the image, such as if the sun is on top of the image but shadows are on the bottom, then regional or local medians may be computed. In one example, the image 402 may be divided into a plurality of squares (e.g., a 3×3 set of squares), a median value may be determined within each square of the plurality (e.g., 3×3 set) of squares, and each determined median value may be used as the threshold within the corresponding square. Each square of the plurality (e.g., 3×3 set) of squares may have a different threshold. In this way, a thresholding method may be applied across different regions of the first image 402 to generate an exaggerated image where the object 412 is highlighted or otherwise differentiated from other elements in the image. It may be appreciated that various other thresholding methods may be applied to the first image data to generate exaggerated images without deviating from the scope of the disclosure. In some examples, each generated image may be flashed intermittently with a raw or unprocessed image while attempting to capture a final image of an associated scene.

Figure 3:
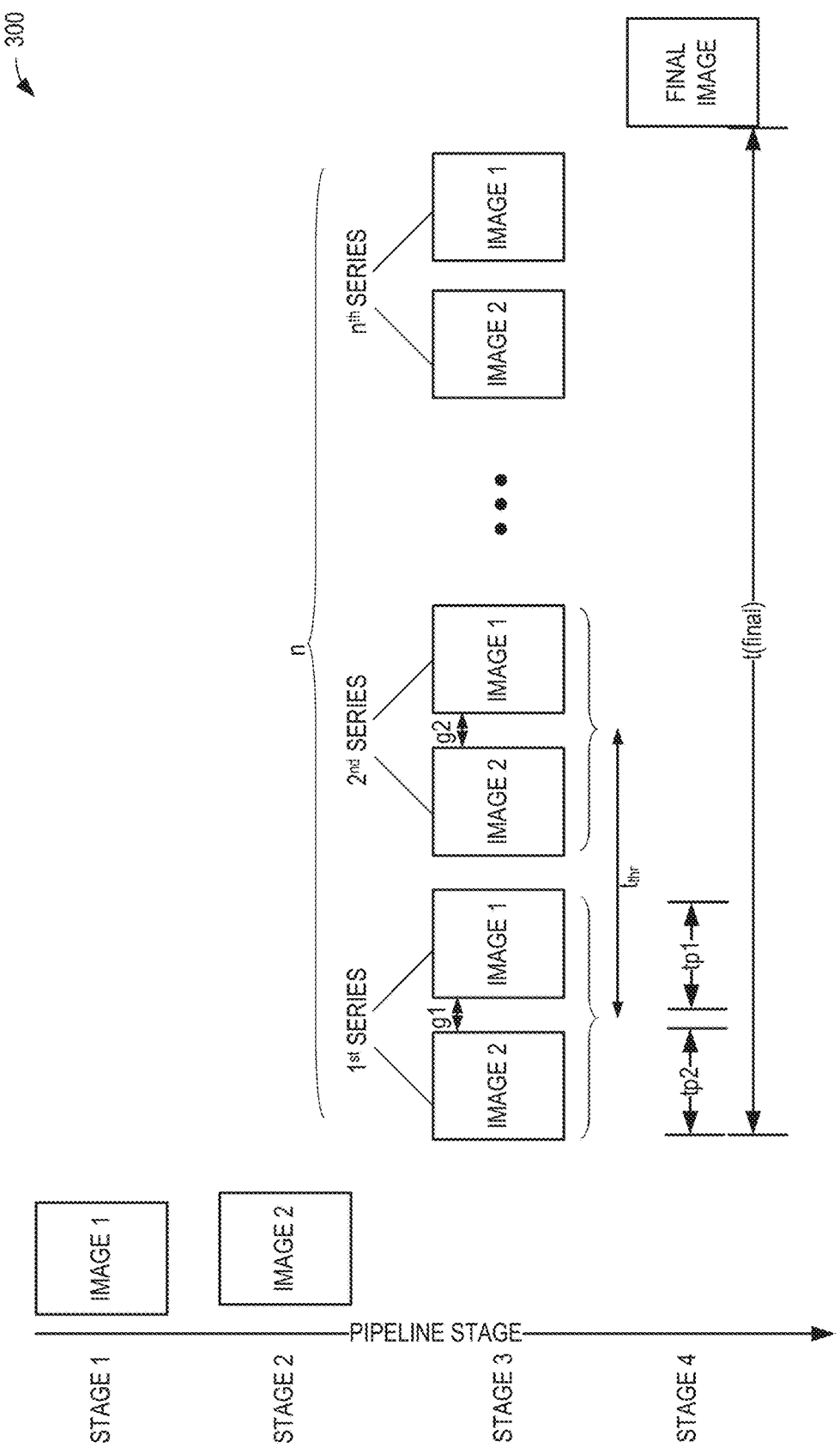
FIG. 3 shows an image processing pipeline in accordance with one or more embodiments of the present disclosure.

By applying the threshold to the first image 402, a visibility of the object 412 may be exaggerated. For example, the object 412 in each of the images 404 and 406 has increased contrast compared to the object 412 in the first image 402. Thus, by generating an image with increased contrast, object visibility may be increased. As a result, the object 412 may be more easily detected in the exaggerated images 404 and 406. In one example, the exaggerated image 404 (or exaggerated image 406) may be flashed along with the first image, while a user of the image sensor is trying to locate the object 412 against a bright background light. When the exaggerated image is flashed, the user may be able to easily detect the object 412 even against the bright background. Once the object 412 is located, the user may center the object 412 and proceed to acquire a final image. In addition to flashing the exaggerated image along with the first image, one or more of a duration between the flash, a number of flashes, a rate of flash, and a persistence of each image may be adjusted dynamically as shown in FIG. 3, further below.

Returning to FIG. 2, the pre-processor 222 may apply thresholding 224 to the image data to exaggerate objects in the image. In some examples, the pre-processor may perform edge detection 226 to determine content of image and further determine location of the object(s) is the image as shown in FIG. 5.

Turning to FIG. 5, view 500 shows a set of images 502 and 504 that have been generated by performing edge detection on the first image 402. As explained previously with respect to FIG. 4, the first image 402 may represent an unprocessed image acquired using an image sensor such as the image sensor 202 of FIG. 2 and/or imaging system 110 of FIG. 1. Edge detection may be used to determine contours of the object 412 of image 402 (e.g., to highlight where one object ends and another one begins), as explained below.

Edge detection may include a variety of methods that aim at identifying points in the image at which the image brightness changes sharply or has discontinuities. In one example, the edge detection may include a Laplacian edge detection where edges in the image 402 may be blurred to generate a blurred image 502. The image 502 may be generated by convolving the image 402 with a Gaussian filter and additionally, a two-dimensional derivative or the Laplacian filtering may be performed on the blurred image to detect edges. In image 502, the points at which image brightness changes sharply may be typically organized into a set of curved line segments termed edges. An example line segment denoting an edge is highlighted by arrow 510 in image 502.

As such, edge detection may be performed to detect and extract features of the image, for example. In some examples, edge detection may be used to estimate a content of the image. For example, edge detection may be used to identify a first object 514, a second object 512, and a third object 506 in the image 502. Additional feature recognition techniques may be used to identify that the first object is a roof, and that the second object and the third object are humans. In this way, the content of the image 502 may be determined.

In some examples, once the edge is detected, additional thresholding and convolutions may be applied to the image 502 to generate an image 504. As explained previously, threshold may be applied to the images to detect objects within the image. As such, thresholding and convolution may be applied to the image 502 to widen the edge. For example, edges detected in image 502 may be blurred and/or diffused to generate image 504. As a comparison, the line segment 510 of image 502 may be widened to result in line segment 514 shown in image 504. In this way, the object 506 may be exaggerated and identified in the image 504.

Returning to FIG. 2, additional pre-processing methods such as image sharpening 234, color augmentation 228, and object classification via machine learning 230 may be applied to the image data to exaggerate objects within the image. For example, image sharpening 234 may be applied to the image data to emphasize texture and to further draw or capture viewer focus towards objects in the image. In some examples, a mask may be applied to the image data to sharpen the image. As such, the mask may result in exaggerating the brightness difference along edges detected within the image. It may be noted that the image sharpening process may create the appearance of a more pronounced edge by increasing the contrast between bright and dark regions to bring out or highlight features of the object. In some example, the image sharpening 234 may be performed by applying a high pass filter to the image data.

In some examples, the pre-processor 222 may augment colors in the image data by performing color augmentation 228. As such, colors may be augmented by determining the dominant color component (red, green, or blue) in each pixel, then reducing the other two color components. In one example, red component may be determined as the dominant color component, and red color in the image data may be augmented by reducing each of the green and blue components in the image by a threshold amount. In one example, the threshold amount may be set as 50%. In another example, the threshold amount may be set as 75%. In this way, the red color may be augmented in the image. In another example (e.g., where blue or green is the dominant color component), blue or green color may be augmented by reducing one or more of the other components (e.g., red/green or blue/red) by the threshold amount. In this way, the resulting image may be exaggerated. Herein, the resulting image may include more than two tones or colors, but fewer colors than the original image.

The pre-processor 222 may perform object classification via machine learning 230 on the image data to classify or recognize objects in the image. In some examples, object classification via machine learning 230 may be used to determine content in the image data. For example, machine learning 230 may be used to describe and label the objects (human, building, etc.) in the image. In some examples, several objects and shapes may be classified and stored in the memory 232. Object classification via machine learning 230 may include comparing shapes of detected objects with those shapes already stored in memory to resolve the detected object.

The pre-processor 222 may perform one or more of the image exaggerating methods and/or combinations of the image exaggerating methods described so far on image data acquired by the image sensor 202. It may be appreciated that the exaggerated image may be generated in real-time, and as such, may be exaggerated to highlight features within the image. In this way, features within the image may be detected more easily. In addition to enhancing the image data, the pre-processor may additionally animate or flicker image data to the user of the image sensor 202. The animation or flicker may be displayed on the display 216 of the image sensor, as described below with reference to FIG. 3. It may be appreciated that the generation of the exaggerated image and the flicker may occur at real-time (e.g., as a user is composing an image, prior to storing an image and/or prior to receiving user input to a shutter or other button controlling the capturing and storage of an image) and may be displayed to the user to facilitate detection of objects within a field of view of the image sensor 202 while the user is trying to compose an image on the display 216 in the presence of glare from the bright source of light.

Turning now to FIG. 3, schematic diagram 300 illustrates an image processing approach for pre-processing a first image acquired using an image sensor. The image sensor may be an example of the imaging system 110 of FIG. 1 and/or image sensor 202 of FIG. 2. At the ordinate of FIG.

3, different pipeline stages, for example, image generation (stage 1), image pre-processing (stage 2), image animation (stage 3), and image acquisition (stage 4), are depicted. At the abscissa of FIG. 3, a time duration is depicted.

Consider an example situation wherein a user is trying to compose and capture a picture of a friend using a camera in his/her mobile phone. In this example, the friend may be standing in front of a restaurant, and the user may be facing the sun. As a result, when the user is trying to compose the picture, the glare from the sun may make it difficult for the user to detect the friend on a display screen of the mobile phone. In some situations, the bright sunlight may additionally reflect off objects (such as vehicles parked near the restaurant and/or user) in the vicinity causing a glare on the display on the mobile phone making it even harder to see any objects in the display of the mobile phone. The present disclosure provides systems and methods for detecting one or more objects in presence of glare by acquiring a first image of the scene, pre-processing the first image to coarsely sharpen features of one or more objects detected within the first image, and then flickering the pre-processed image along with the original first image, thereby making it possible for the user to quickly identify objects while trying to compose the image. Once the user detects an object of interest, the user may then be able to center the object of interest, and then proceed with acquiring a final image of the object of interest. In this way, by flickering exaggerated images, objects may be easily detected even in the presence of glare. The steps used to pre-process image and animate the images are discussed below.

When an amount of glare at or near an object being imaged is higher than a threshold, a first image (e.g., image 1 in FIG. 3) may be acquired at the image generation stage (e.g., stage 1 in FIG. 3). As discussed previously, the amount of glare may be determined based on an output of a light level sensor positioned at or near the object and/or the image sensor. When the output of the light level sensor (such as light level sensor 204 of FIG. 2) is higher than the threshold, image 1 may be acquired using an image sensor and pre-processing of image 1 may be activated. In other examples, determining that an amount of glare or light intensity is above a threshold may include receiving an indication from a user (e.g., via user input requesting assistance with composing the image). Pre-processing of image 1 may include applying one or more pre-processing techniques such as thresholding, inversion, transposing, edge detection, image sharpening, object classification via machine learning, and color augmentation to image 1, as described previously. Image 1 may be transferred to the pre-processing stage (e.g., stage 2 in FIG. 3) with little or no delay (e.g., immediately upon being acquired). The pre-processing techniques performed on image 1 may enhance or exaggerate features of objects detected within image 1. For example, when thresholding is applied to image 1 to generate image 2, objects within image 2 may have increased contrast making it easier for the user to detect the objects. In one example, image 2 may be a grayscale or black and white image with maximum contrast (between the black and the white regions in image 2).

Each of image 1 and image 2 may be stored in a temporary or cache storage (e.g., to be overwritten automatically as additional images are acquired and/or generated). For example, image 1 may correspond to a preview image presented to a user. Image 1 may be updated in real-time at regular intervals (e.g., at an associated frame rate) to capture changes in the environment and/or changes in the positioning of the image sensor. Accordingly, image 1 may be temporarily stored until a next preview image is acquired and/or until a flickering process (described below with reference to stage 3) is performed). Likewise, an exaggerated image (e.g., image 2) may be generated each time a new preview image (e.g., image 1) is acquired and stored until a next exaggerated image (e.g., corresponding to a next preview image) is generated. In other examples, the preview and exaggerated images may be stored in a buffer (e.g., a first in, first out buffer) such that a preview or exaggerated image is only overwritten when the buffer is full and a new preview or exaggerated image is acquired or generated.

In some examples, pre-processing used to generate image 2 may include applying edge detection to image 1 and additionally applying thresholding to further highlight edges along objects detected in image 1. In some examples, one or more of the above-mentioned pre-processing techniques may be used in combination to determine a content of image 1. For example, if image 1 has three objects (e.g., a dog, a human, and a building), then an edge-detection technique may be applied to image 1 to isolate all of the three objects in image 1. In some examples, machine learning may be additionally applied to identify or label the three objects as dog, human, and building in image 1. In this way, content of the image may be determined.

Image 2 may also be referred to as pre-processed or exaggerated image. Upon generating image 2, both image 1 and image 2 may be transferred to the image animation stage (e.g., stage 3 in FIG. 3). At stage 3, a series of images may be flickered or flashed on a display of the imaging system. Each series may include a display of at least one exaggerated image (e.g., image 2) followed by the original or unprocessed or raw image (e.g., image 1) and/or another order of exaggerated images and original/unprocessed/raw images. The image animation (stage 3) may flicker the series of images at a flicker rate r. Specifically, the $1^{st}$ series of images (e.g., $1^{st}$ flicker set), the $2^{nd}$ series of images (e.g., $2^{nd}$ flicker set), and so on until the nth series of images (e.g., nth flicker set) may be displayed consecutively on the display of the image sensor at the flicker rate r. In one example, the flicker rate may be set to 2 Hz, wherein the time between the $1^{st}$ series and the $2^{nd}$ series of images $t_{fr}$ may be 0.5 sec. In another example, the flicker rate may be set to 4 Hz, where the time $t_{fr}$ may be 0.25 sec.

The flicker rate r may be adaptively adjusted based on one or more of a user preference, a user skill level, an amount of light or glare, a content of the image, and a motion of the camera. Any number and combination of the above adjustment parameters may be used to set the flicker rate, where each parameter that is used may have an associated weight (e.g., a user preference may be overridden by an amount of light or glare that exceeds a threshold, or at least a first parameter may be used to set a maximum and/or minimum flicker rate, and at least a second, different parameter or multiple other parameters may be used to set the flicker rate within the maximum and/or minimum range). In one example, the user may prefer to have the images flicker at 2 Hz, for example. Accordingly, the flicker rate may set to 2 Hz responsive to user input (e.g., an active user selection of an associated user interface element) requesting the desired flicker rate (e.g., 2 Hz). The user may change the preference at any time while the images are being flickered, prior to the images being flickered, or after the images are flickered. For example, when the images are flashing at 2 Hz, the user may find it difficult to see the objects, and hence may reduce the flicker rate from 2 Hz to 1 Hz. In another example, the user may wish to increase the rate, and accordingly the flicker rate may be increased from 2 Hz to 4 Hz, for example. In some example embodiments, the flicker rate may be increased up to a maximum rate, wherein the maximum rate may be a flicker fusion rate. The flicker fusion rate is the rate at which intermittent flashes may appear to completely steady to an average human observer. If a user requests to change the flicker rate to a rate that is above the maximum rate (e.g., the flicker fusion rate), the imaging system may display or otherwise output a warning indicating that the request is above the maximum rate. The imaging system may either not change the flicker rate or set the flicker rate to the maximum rate responsive to a user request to set the flicker rate to a value that is above the maximum rate.

The flicker rate may additionally or alternatively be adjusted based on user skill level. For example, for a novice or inexperienced user who is not adept at using the image sensor, the images may be flickered at a lower rate, however as the user experience with the image sensor increases (e.g., based on a number of images captured by the user, an amount of time the user has operated the imaging system, and/or an evaluation of images captured by the user with the imaging system—such as an evaluation of a composition of images captured by the user), the flicker rate may be increased. For example, when the user uses the image sensor in the animation mode for the very first time, the series of images may be flickered at 2 Hz. However, as the user uses the animation mode effectively in identifying objects, the flicker rate may be increased to 4 Hz, for example. In some examples, the user experience may be derived from a time the user takes to detect objects in the image while the images are being flickered (e.g., as identified by user input and/or an amount of time that the user takes to capture an image). For example, a novice user may take 5 sec to identify objects within the image as the series of images are being flickered at 2 Hz. With experience, the time taken to identify objects may start decreasing (e.g., time taken may decrease from 5 sec to 3 sec). As such, when the time taken to identify the objects within the image decreases to 3 sec, the user may be considered to be an experienced user, and accordingly, the flicker rate may be increased to 4 Hz for that user. A user may be identified by any suitable mechanism, including user authentication (e.g., a user sign-in to the imaging system), image recognition, voice recognition, fingerprint or other biometric identification, etc. A user profile correlating the user (e.g., identification parameters for the user) with a user experience level may be stored locally at the imaging system and/or in a storage device that is accessible by the imaging system.

The flicker rate may be additionally or alternatively adjusted based on the image content. One or more pre-processing techniques such as edge detection, and object classification via machine learning may be used to determine the image content. The image content may include one or more of a number of objects in the image, a shape of object, and a type of object. In one example, a higher number of objects and/or shapes of objects detected in image 1 and/or image 2 may indicate a higher image content, and accordingly, the flicker rate may be decreased. In this way, the flicker rate may be inversely proportional to the number of objects and/or shapes of objects detected in the image. In some examples, if there are more humans than buildings in the image, then a higher image content may be indicated, and as a result, the flicker rate of flicker may be decreased. By decreasing the flicker rate, a spatial attention or awareness or perception of the high number of objects in the image may be increased.

The flicker rate may be additionally or alternatively adjusted based on the amount of light or glare present in the image and/or on the display associated with the imaging system. It may be noted that the image processing approach shown in FIG. 3 may be performed only when the light level is higher than a first threshold. When the light level is higher than a second, higher threshold (higher than the first threshold), then the flicker rate may be further adjusted. In one example, the flicker rate may be increased when the output of the light sensor is greater than the second threshold. The amount by which the flicker rate is changed may be proportional to a difference of the measured light level from the second threshold.

Consider the first threshold level to be I1, the second threshold level to I2 (herein I2>I1), and the measured light level to be I. When I is greater than I2 (e.g., I>I2>I1), then the flicker rate may be increased by Δr. In one example, Δr may be proportional to a difference (I−I2). In another example, Δr may be proportional to a difference (I−I1).

The flicker rate may additionally or alternatively be adjusted based on a motion of the camera (e.g., as detected by one or more motion sensors integrated in and/or in communication with the camera, such as one or more gyroscopes and/or accelerometers). For example, if the camera is being moved around a great deal (e.g., by an amount that is above a threshold that accounts for normal hand shaking during image capture), then the photographer has likely not yet centered the image or otherwise directed the camera toward an intended subject. Accordingly, under such conditions, the flicker rate may be increased relative to conditions where camera movement is below the threshold. In this way, the flicker rate may be set to a first value while the movement of the camera is above the threshold and the flicker rate may be set to a second value, lower than the first value, while the movement of the camera is below the threshold. In other examples, the flicker rate may increase (e.g., proportionally or according to a selected mathematical curve) with increasing camera movement.

By decreasing the flicker rate, the series of images may be flashed at a slower rate, thereby giving the user more time to perceive and detect the objects in each image. By increasing the flicker rate, the series of images may be flashed at a faster rate, thereby decreasing the delay between the presentation of image sets and increasing an overall time of displaying processed (e.g., thresholded) images relative to unprocessed (e.g., raw and/or color) images. In this way, the flicker sets may be flickered at the flicker rate, which in turn may be dynamically adjusted based on one or more conditions including user preference, user skill level, amount of glare, image content, and motion of the camera in order to provide targeted assistance for locating objects during a given condition.

Each series of images or flicker set is composed of at least two images, namely image 2 and image 1 in the example of FIG. 3. As such, the images of the flicker set are flashed consecutively. It may be appreciated that image 2 is an exaggerated image of image 1. In some examples, image 2 may be a grayscale or monochromatic image while image 1 may be a color image. By flashing the series of images while the user is trying to compose an image in bright light, the user may be able to detect or perceive objects that would have otherwise been obscured by the glare from the bright light. In this way, the user may be able to identify the objects in the presence of glare.

Similar to the flicker rate of flicker of the series of images as described previously, parameters such as a gap (also referred to as a duration) g, flicker count n, and a duration or persistence tp of each image in the series may be adjusted based on one or more of the user preference, user skill level, the amount of glare, the image content (which may include a change or rate of change in image content), and an amount and/or type (e.g., direction, rotation, acceleration) of motion of the camera. Each of the above parameters may be adjusted based on any combination of one or more of the user preference, user skill level, amount of glare, image content, and camera motion in the manner described above with respect to the flicker rate (e.g., including the weighting described above). However, it is to be understood that some or all of the parameters (e.g., flicker rate, gap, flicker count, and duration of each image) for the flickering may be differently affected by associated user preference, user skill level, amount of glare, image content, and camera motion. In a non-limiting, illustrative example, user preference may be weighted most heavily for determining a flicker rate, while image content may be weighted most heavily for determining a flicker count.

In an exemplary $1^{st}$ series of images, the gap between image 2 and image 1 may be set to a value g1. Likewise, the gap (or spacing) between image 2 and image 1 in the $2^{nd}$ series may be set to a value g2, and so on. In one example, the gap may be the same for all the series of images (e.g., $1^{st}$ series through nth series). Thus, g1=g2 . . . =gn=g, and the gap g may be determined based on a user preference. In one example, the gap g may be input by the user. For example, the user may prefer to have a gap of 1 sec between image 2 and image 1 of the series, and accordingly, the gap g may be set to 1 sec. In another example, the user may prefer to have a gap of 1.5 sec between image 2 and image 1 of the series and accordingly, the gap g may be set to 1.5 sec. In another example, the gaps between image 2 and image 1 in successive series may not be constant. Specifically, g1≠g2 . . . ≠gn, and the user may specify the values g1 through gn. In one example, the gaps between image 2 and image 1 may progressively increase in the series, implying that g1<g2 . . . <gn. In another example, the gaps in successive series may decrease, implying that g1>g2 . . . >gn. In such examples where the gaps are progressively increasing or decreasing, the user may be able to provide a starting gap (e.g., g1), and then the gaps g2 through gn may be automatically determined. In one example, successive gaps may increase or decrease by 10%, thus the gaps of the series may be g1, g1±0.1*g1, and so on.

In this way, the gap between successive images of the flicker sets may be adaptively adjusted based on user preference. In some examples, the gap may be additionally or alternatively adjusted based on the amount of light (or glare), image content, and/or camera motion. For example, if the amount of light is higher than a light threshold, the image content is higher than a threshold content, and/or a camera motion is higher than a motion threshold, then the gap between successive images of the series may be decreased, in which case image 2 and image 1 may be flashed closer together. It is to be understood that the light threshold, threshold content, and/or motion threshold used for the gap determination may be a different value than the light threshold, threshold content, and/or motion threshold used for the flicker rate determination described above. Thus, by decreasing the gap, the raw or unprocessed image (e.g., image 1) may be flashed right after the exaggerated image (e.g., image 2), thereby assisting the user in locating the objects.

Similar to the gap or duration between successive images of the series, the flicker count n may also be adjusted based on one or more of the user preference, user skill level, the amount of glare, the image content, and an amount of motion of the camera. The flicker count n refers to the number of time the series are flashed on the display to the user. In one example, the flicker count may be set based on user preference. The user may prefer to have the series flickered 4 times, for example. Based on the user preference, the value of n may be set to 4. In some examples, the flicker count may be additionally or alternatively adjusted based on user skill level. As such, the user may increase in skill level as he/she gains more experience using the animation to detect objects obscured by presence of glare. As the user skill increases, the flicker count may be decreased, for example.

The flicker count n may be additionally or alternatively adjusted based on the amount of glare present, the image content, and/or the camera motion. For example, if the amount of light is higher than a light threshold, the image content is greater than a threshold content, and/or the camera motion is greater than a motion threshold, then the flicker count may be increased. It is to be understood that the light threshold. threshold content, and/or motion threshold used for the gap determination may be a different value than the light threshold, threshold content, and/or motion threshold used for the flicker rate and/or gap determination described above. In some examples, the flicker count n may be increased proportional to the amount of light. As the amount of light increases, the flicker count may be increased. In some more examples, the flicker count n may be increased proportional to a percentage increase of the light level I above the second threshold I2. For example, if the amount of light is higher than the second threshold I2 by 50%, then the flicker count may be accordingly increased by 50% rounded to the next integer count (e.g., increased by one count for a current flicker count of 2 or 3). It may be appreciated that when the amount of glare or amount of light drops below the first threshold I1, then the flicker count n may be set to 0, at which point the flickering of the images may be stopped.

The flicker count n may be additionally or alternatively adjusted based on image content and/or camera motion. For example, if the image content is higher than a threshold content and/or if the camera motion is higher than a motion threshold, then the flicker count n may be increased. Otherwise, the flicker count may be maintained or decreased for image content and/or camera motion that is at or below an associated threshold. By increasing the flicker count, the user may be able to detect and identify more objects within the image, and hence may be able compose the image more accurately.

Similar to the gap g and the flicker count n, a persistence tp of each processed or exaggerated image in the series may be adjusted based on one or more of the user preference, user skill level, the amount of glare, the image content, and motion of the camera. The persistence tp may be refer to the duration for which each image of the series is displayed. As shown in the schematic diagram 300, image 2 and image 1 may persist for different durations, meaning image 2 and image 1 may have different persistence. For example, the user may prefer to have the exaggerated image persist for a longer time relative to the unprocessed image. Accordingly, the persistence tp2 of image 2 may be set to be larger than the persistence tp1 of image 1 (e.g., tp2>tp1). In another example, the user may prefer to have image 2 flash for a shorter duration than image 1, and accordingly, the persistence tp2 of image 2 may be set to be smaller than the persistence tp1 of image 1 (e.g., tp2<tp1). In yet another example, the user may prefer to have both images be displayed for the same duration, and accordingly, the persistence tp2 of image 2 may be set to be the same as the persistence tp1 of image 1 (e.g., tp2=tp1).

The persistence of each processed or exaggerated image of the series (e.g., each "image 2" in the series) may be further adjusted based on the amount of glare present, the image content, and/or motion of the camera. Similar to the flicker count n, if the amount of glare or light level is higher than the second threshold I2, the image content is higher than a threshold content, and/or the camera motion is higher than a motion threshold, then the persistence may be increased. It is to be understood that the second threshold, threshold content, and/or motion threshold used for the persistence determination may be a different value than the second threshold, threshold content, and/or motion threshold used for the flicker rate, gap, and/or flicker count determinations described above. In some examples, the persistence of each image of the series may be increased proportionally to the amount of light. As the amount of light increases, the persistence tp2 may be increased. By increasing the persistence of the exaggerated image, the user may be given increased time to locate objects in the presence of bright light with the assistance of the exaggerated image.

Multiple users may be able to input the preference for each of the parameters including flicker rate, the gap, the flicker count, and the persistence. As such, the preferences of the multiple users may be stored in a memory of the image sensor, and recalled when a user profile associated with one of the multiple users is selected, for example. It may be appreciated that sensitivity to flicker may vary from user to user, based on age of the user, visual acuity, etc. In some examples, a user may input his/her age and visual acuity, and one or more of the parameters may be automatically adjusted based on the age and/or visual acuity of the user. A younger user (e.g., age <35 years) may be more sensitive to flicker than an older user (e.g., age >35 years) and consequently, the flicker rate of flicker may be increased for the younger user and decreased for the older user. In some examples, if the user is wearing corrective lens, then the flicker rate may be further adjusted based on a power specification of the corrective lens. For example, if a first user uses a corrective lens with a power specification of +0.25 D and a second user uses a corrective lens with a power specification of +4.00 D, then the flicker rate selected for the second user may be lower than the flicker rate selected for the first user.

In some more examples, one or more of the parameters may additionally or alternatively be adjusted based on an intensity or brightness of the display screen, and a distance of the screen from the user. As an example, if the brightness of the screen is higher than a threshold (e.g., 90%), then the flicker rate may be decreased.

In this way, the images may be animated in the image animation stage and the user may be able to detect objects in the image which would have otherwise been obscured by the glare caused by bright light, for example. Once one or more objects are detected by the user, the images may be transferred to stage 4 or image acquisition stage. Herein, the animation of the images may be stopped. The user may be able to compose and acquire the final image based on objects detected at the image animation stage. Once the final image is acquired, the final image may be stored in the memory of the image sensor (e.g., a different, more permanent memory location than the memory location at which image 1 and image 2 are stored). It may be appreciated that once the final image is acquired, image 1 and image 2 may be discarded and/or otherwise available to be overwritten. The image acquisition stage may be entered responsive to an active user-driven trigger (e.g., a user input to a user interface element for controlling a shutter or other element of the imaging system to capture an image) and/or automatically responsive to completing stage 3 (e.g., upon flickering all of the n sets of images).

Figure 6:
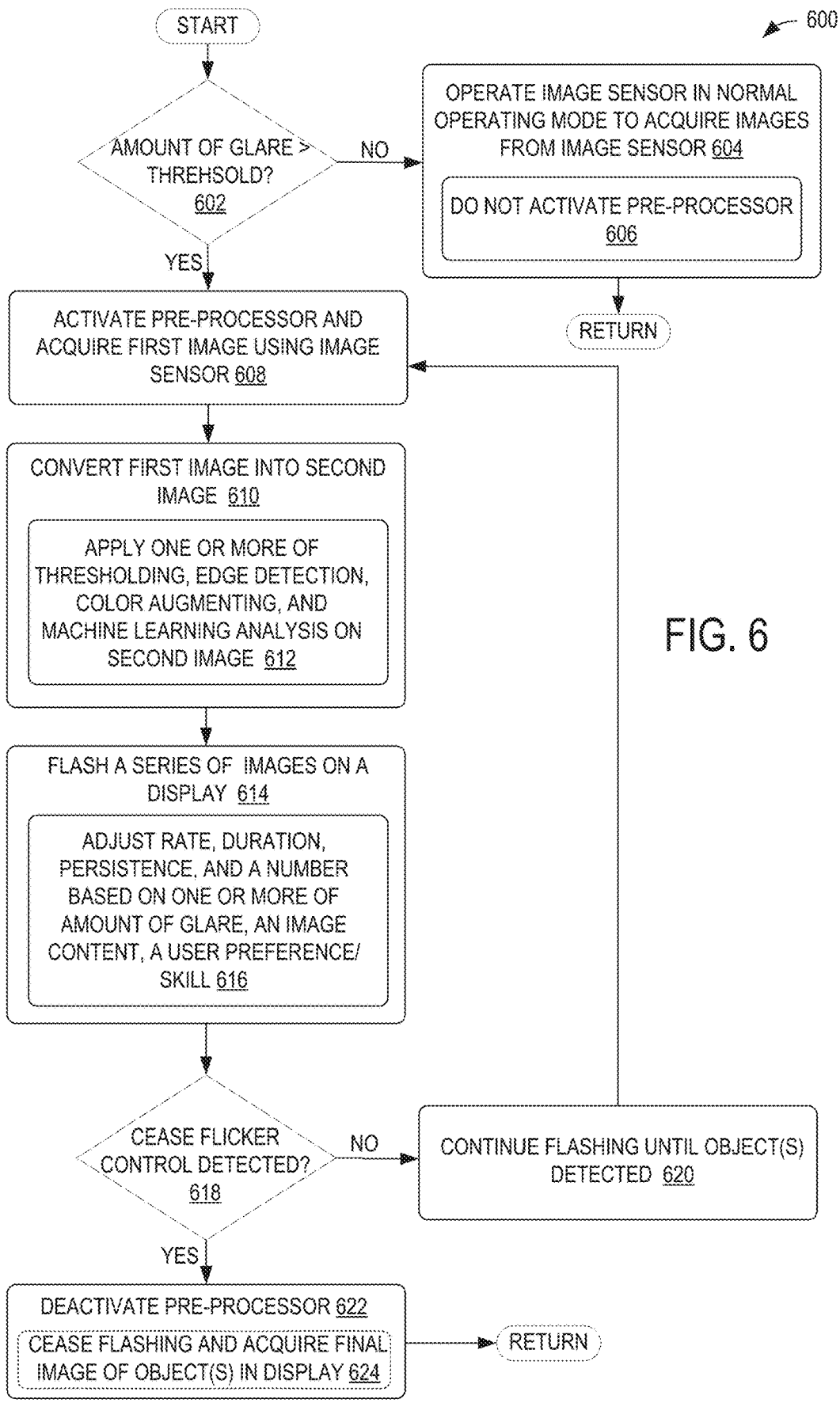
FIG. 6 shows a flow chart of an example method for pre-processing images acquired from the image sensor and additionally animating the images to enable object detection in the presence of the bright background light in accordance with one or more embodiments of the present disclosure.

Turning now to FIG. 6, an example method 600 for detecting objects within a display of an image sensor in the presence of glare is shown. The image sensor may be a non-limiting example of the image sensor 202 of FIG. 2 and/or the imaging system 110 of FIG. 1. In one example, the image sensor may be a camera configured to acquire images. Instructions for carrying out method 600 may be executed by a processor (processor 214 of FIG. 2 and/or pre-processor 222 of FIG. 2) based on instructions stored on a memory of the processor and in conjunction with signals received from light level sensors and a user, as described above with reference to FIGS. 2-3. Specifically, method 600 includes activating pre-processing of images only in the presence of glare from a bright source of light.

Method 600 begins at 602 where it is determined if an amount of glare is above a first threshold. As explained previously, glares may be caused on a display of the image sensor when the image sensor is used to capture an image of an object in the presence of a bright background light. The bright light may enter a lens of the image sensor and make it difficult for a user to find the object on the display. The amount of glare may be measured by measuring the amount of light entering the lens of the sensor, for example. As such, the image sensor may include a light level sensor that determines the amount of light entering the lens, for example. The output of the light level sensor may be used to determine the amount of glare in the sensor. In one example, the first threshold may be set as 40,000 lux. If the amount of glare is below the first threshold (e.g., "NO" at 602), then method 600 proceeds to 604 where the image sensor is operated in a normal operating mode to acquire images from the image sensor. Operating the image sensor in the normal operating mode may include not activating a pre-processor (such as pre-processor 222 of FIG. 2) of the image sensor. Thus, objects within the field of view of the image sensor may be visible without the need of additional pre-processing, and the image sensor may be used to directly acquire the final image without any pre-processing. Method 600 returns.

If the amount of glare is above the threshold (e.g., "YES" at 602), then method 600 proceeds to 608 where method 600 includes activating the pre-processor and acquiring a first image using the image sensor. It may be appreciated that the first image acquired using the image sensor may be different from the final image acquired using the same sensor. Herein, the first image is acquired at an image generation stage (e.g., stage 1 of FIG. 3) of the pre-processor, whereas the final image is acquired directly at an image acquisition stage (e.g., stage 4 of FIG. 3) where stages 1 through 3 are bypassed.

At 610, method 600 includes converting the first image into a second image. Converting the first image into the second image may include transferring the first image from the image generation stage to an image pre-processing stage (stage 2 of FIG. 3). In addition, converting the first image into the second image may include applying one or more pre-processing techniques to exaggerate features or objects of the first image at 612. Some example pre-processing techniques include thresholding, edge detection, color augmenting, object classification via machine learning, and image sharpening. One or more pre-processing techniques may be applied to the first image to generate the second image. The first image may also be referred to as raw or unprocessed image, while the second image may be referred to as an exaggerated or pre-processed image. As an example, the second image may be generated by applying thresholding to the first image. As a result, objects may be more exaggerated in the second image and may additionally have increased contrast, making it easier for the user to identify the objects. Edge detection may be applied to exaggerate edges of objects thereby increasing visibility of the objects in the second image. Machine learning may be applied to estimate a content of the image, for example. Herein, the content of the image may include details such as object type, object shape, and number of object. Various other techniques may be used to exaggerate features and/or objects detected in the first image.

At 614, method 600 includes flashing a series of images on the display of the image sensor. Flashing the series of images may be performed at an animation stage (e.g., stage 3 of FIG. 3) of the pre-processor. As explained previously with reference to FIG. 3, animating the images may include flickering the second image and the first image in a series on the display of the image sensor while the user is trying to compose the image. Flickering the second image and first image may direct the user's focus towards the exaggerated objects, thereby making it easier for the user to detect the objects even in the presence of glare.

Flashing the series of images on the display may additionally include adjusting a flicker or flicker rate, a duration or gap between successive images of the series, a persistence of each image in the series, and a number of series based on one or more of the amount of glare (or light level detected), a user preference, a user skill, and an image content at 616. For example, in response to the amount of glare being higher than a second threshold (wherein the second threshold is higher than the first threshold of 602), and/or the image content is higher than a threshold content, then method 600 includes performing one or more of increasing the number, decreasing the duration, decreasing the flicker rate, and increasing the persistence. In this way, parameters such as rate, duration, persistence, and number may be dynamically adjusted to help the user to detect and locate objects in the display even in the presence of glare.

At 618, method 600 includes determining if a cease flicker control is detected. For example, flashing the series of images may help focus the user's attention on the objects in the display, and additionally help to detect the objects. In some examples, the user may request the flashing to stop once the user has detected the objects and/or completed an image capture system. The user request (e.g., a voice command, gesture/touch input, and/or other user input) may be detected by the system as the cease flicker control. In additional or alternative examples, the imaging system may detect the cease flicker control based on a motion of the camera, a composition of the image (e.g., when an object of interest, such as person in an imaged scene, is positioned at a targeted location, such as within a central region or center of the image), and/or other automatic sensing. In such examples, the imaging system may detect that a motion of the camera is below a motion threshold associated with the cease flicker control (e.g., detect that the camera is still, such as when the camera is set down or otherwise no longer held by the user). In further additional or alternative examples, the imaging system may detect the cease flicker control based on a status of the flickering of images. For example, the method may automatically proceed to 622 upon determining that a threshold set of flickered images have been presented (e.g., a number of sets based on user preference, amount of glare, etc., as described above with respect to FIG. 3), and otherwise proceed to 620.

If objects are not detected by the user (e.g., "NO" at 618), then method 600 proceeds to 620 where the images are continued to be flashed on the display until the objects are detected by the user. Method returns to 608 where a first image is reacquired (e.g., to account for changes in the environment/viewpoint of the camera due to camera movements and/or the passage of time) and the parameters are continued to be adjusted until the case flicker control is detected.

If the case flicker control is detected (e.g., "YES" at 618), then method 600 proceeds to 622 where the pre-processor may be deactivated. For example, as described above, the user may stop the pre-processing via user input, and/or the system may automatically stop the pre-processing responsive to detecting an end of the image capture session.

Deactivating the pre-processor may include ceasing the flashing of the series of images at 624. Additionally, a final image of the objects detected may be acquired by the user. In one example, the final image may be stored in memory while the first image and the second image may be discarded, deleted, or otherwise made available for overwriting. Thus, the first image and the second image may be transient images used for the sole purpose of detecting objects in the display when glare is present. Method 600 may be repeated for each final image acquisition and/or terminated responsive to an imaging system shut down or detection that a user is no longer attempting to capture an image (e.g., detecting that a lens cover is applied, detecting that the user is no longer viewing the display, detecting that the imaging system is no longer exposed to the threshold amount of glare, etc.). In this way, by flickering images on the display of the image sensor, objects which would have been normally obscured by the presence of bright light, may be made visible to the user. Thus, the user may be able to quickly detect the objects while he/she is composing an image in bright light.

Figure 7:
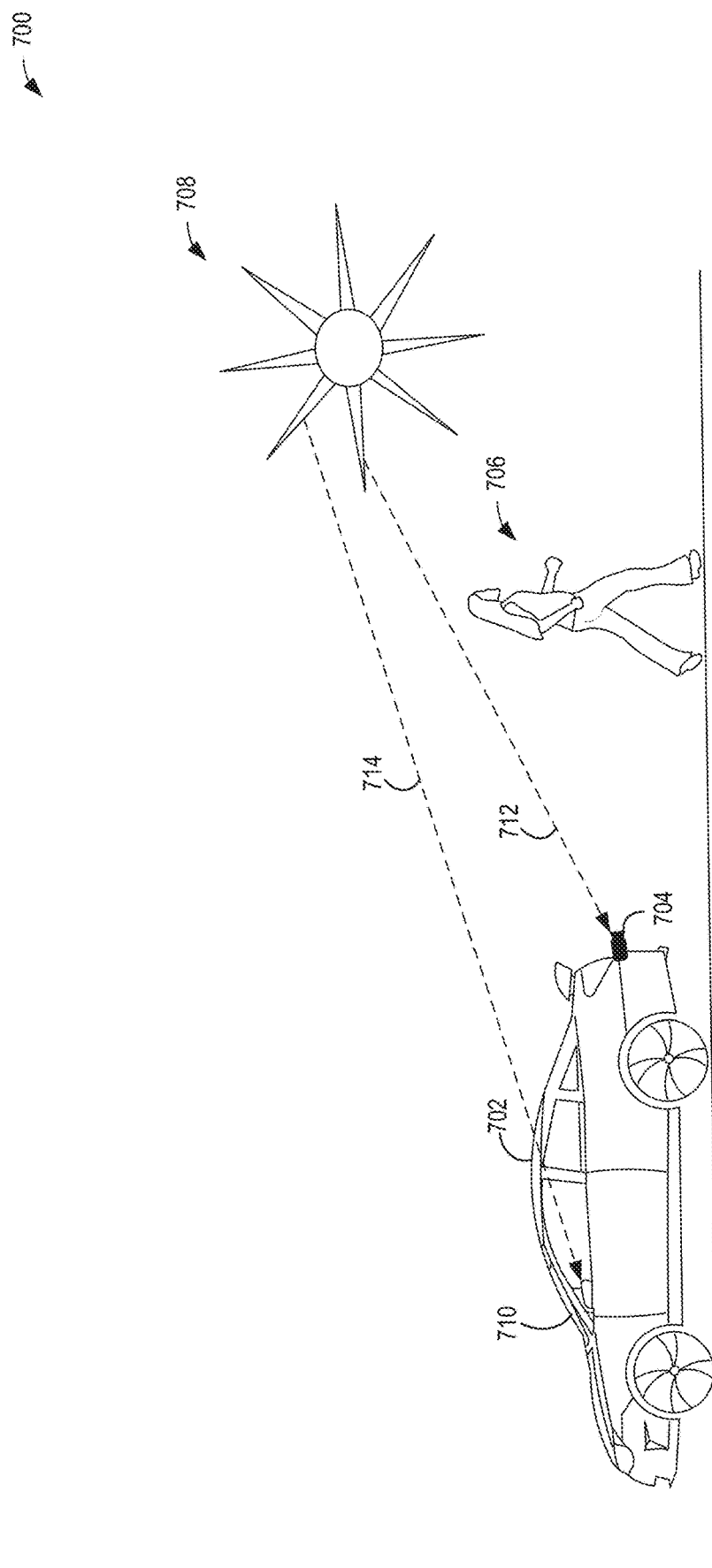
FIG. 7 shows an example scenario where an object in the path of the vehicle may not be detected in the presence of the bright background light in accordance with one or more embodiments of the present disclosure.

The issue of bright light obscuring images on the display of the image sensor may be prevalent in any suitable imaging system. For example, automotive backup camera images may be difficult to view when the sun is shining toward the camera lens, as shown in FIG. 7. Turning now to FIG. 7, an example environment 700 is shown, in which a vehicle 702 having a camera 704 is driving during the day is in the presence of light source 708 (e.g., the sun). Consider a first situation wherein the vehicle 702 is facing west during sunrise and also consider a second situation wherein the vehicle 702 is facing east during sunset. In both the first and the second situation, the sun (light source 708) may obstruct the field of view of the camera 704. In the example scenario 700, the camera 704 is a back-up camera mounted to a rear of the vehicle 702. In other examples, the camera 704 may be a front-facing camera mounted to a front of the vehicle 702 or a side camera mounted to a side of the vehicle 702. The light source 708 may directly shine into the lens (as indicated by arrow 712) of the camera and cause glare in images captured by the camera 704. In an additional or alternative example, the light source 708 may directly shine onto a display in the vehicle (as indicated by arrow 714) and cause glare on the display of the images captured by the camera 704. As a result of either of the above examples, an image of an object 706 captured by the camera 704 in the presence of glare from the sun 708 may be degraded.

In some examples, the light from the light source 708 may be so bright that the object 706 may not even be seen in the image captured by the camera 704. When the image is displayed to a driver of the vehicle 702, the driver may not be able to see the object 706, while reversing the vehicle, for example. The disclosure provides systems and methods for flashing, flickering, or otherwise intermittently displaying a series of images (as explained with reference to FIG. 3) on a display, such as a display located inside the vehicle 702, to detect objects in the environment, such as the object 706.

Figure 8:
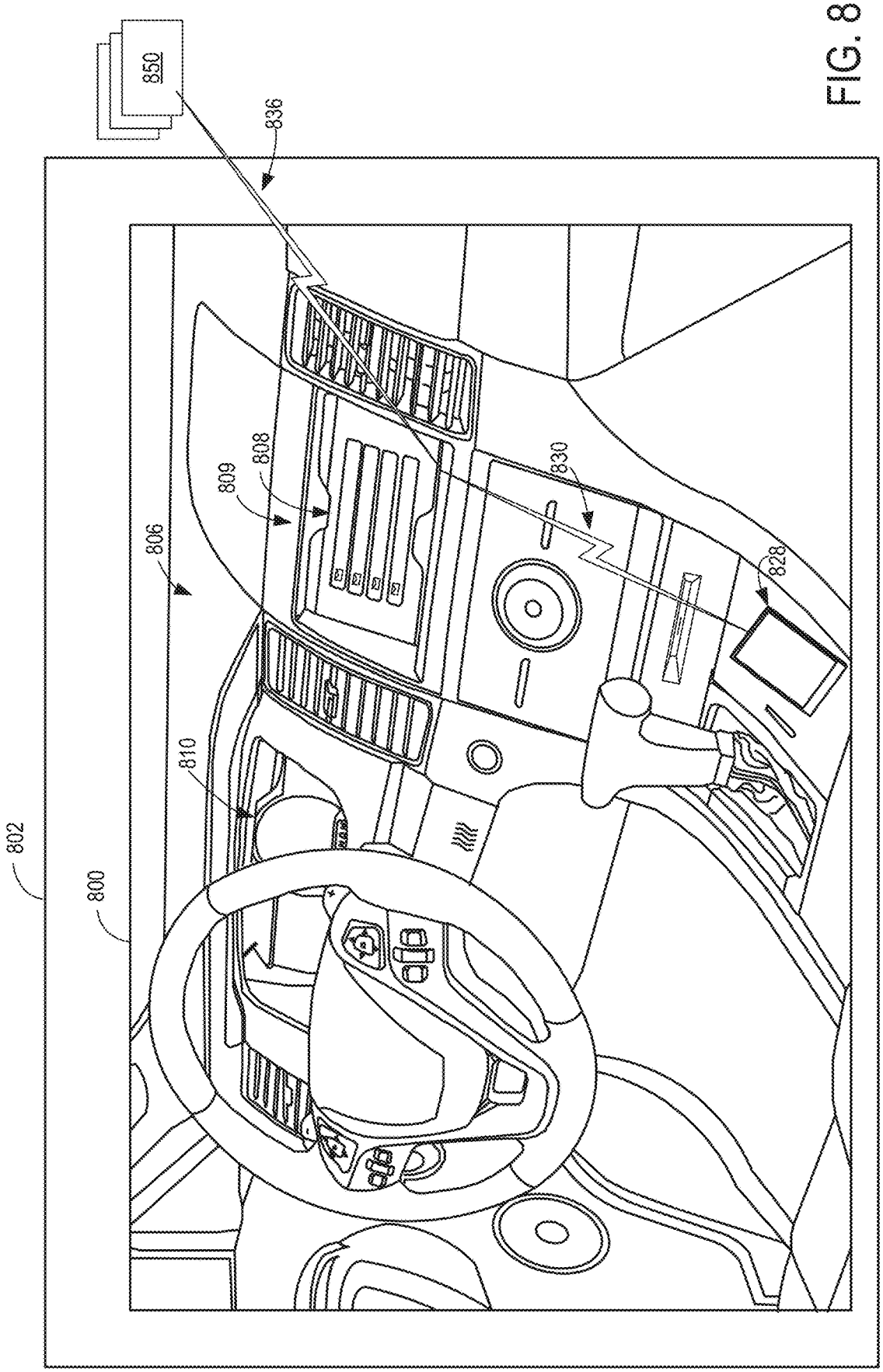
FIG. 8 shows an example partial view of a vehicle cabin in accordance with one or more embodiments of the present disclosure.

Turning now to FIG. 8, an example partial view of one type of environment for a communication system is shown, including an interior of a cabin 800 of a vehicle 802, in which a driver and/or one or more passengers may be seated. Vehicle 802 may be a non-limiting example of vehicle 702 of FIG. 7. Vehicle 802 may be a road automobile, among other types of vehicles.

As shown, an instrument panel 806 may include various displays and controls accessible to a driver (also referred to as the user) of vehicle 802. For example, instrument panel 806 may include a display 808 of an in-vehicle computing system 809 (e.g., an infotainment system), an audio system control panel, and an instrument cluster 810. The display 808 may be an interactive touchscreen display.

The example system shown in FIG. 8 may include display controls that may be performed via a user interface of in-vehicle computing system 809, such as display 808. The in-vehicle computing system or the display system controls may control parameters that affect display of images on the display 808. As described previously with reference to FIGS. 2 and 3, camera images may be subject to glare, and in order to detect objects in the presence of glare, a series of images may be flashed on the display. Herein, the in-vehicle computing system or the display system controls may control one or more parameters such as rate of flicker, a gap between images of the series, a persistence of each image in the series, and flicker count based on preferences input by the user via the user interface. In some example embodiments, the user may activate pre-processing of images when he/she feels that additional help is needed to isolate objects in images captured by cameras mounted on the vehicle 802, as described further below.

In some embodiments, one or more hardware elements of in-vehicle computing system 809, such as touch screen, a display screen, various control dials, knobs and buttons, memory, processor(s), and any interface elements (e.g., connectors or ports) may form an integrated head unit that is installed in instrument panel 806 of the vehicle. The head unit may be fixedly or removably attached in instrument panel 806. In additional or alternative embodiments, one or more hardware elements of the in-vehicle computing system may be modular and may be installed in multiple locations of the vehicle.

The cabin 800 may include one or more sensors for monitoring the vehicle, the user, and/or the environment. For example, the cabin 800 may include one or more microphones to receive user input in the form of voice commands, light sensors to detect a presence of light in the vehicle and/or impinging on the display 808, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as from sensors coupled to external devices 850 and/or mobile device 828. In one example, the sensors may include camera mounted to the vehicle 802 configured to capture images of an environment surrounding the vehicle 802. The sensors may additionally include light level sensors which are also mounted to the vehicle 802. An output of the light level sensor may be used to activate and deactivate pre-processing of images as described further below.

Cabin 800 may also include one or more user objects, such as mobile device 828, that are stored in the vehicle before, during, and/or after travelling. The mobile device 828 may be connected to the in-vehicle computing system via wired or wireless communication link 830. For example, the communication link 830 may provide sensor and/or control signals from various vehicle systems and the touch screen 808 to the mobile device 828 and may provide control and/or display signals from the mobile device 828 to the in-vehicle systems and the touch screen 808.

In-vehicle computing system 809 may also be communicatively coupled (e.g., directly or indirectly, via an intermediate device) to additional devices operated and/or accessed by the user but located external to vehicle 802, such as one or more external devices 850. In the depicted embodiment, external devices 850 are located outside of vehicle 802 though it will be appreciated that in alternate embodiments, external devices may be located inside cabin 800. The external devices may include a server computing system, personal computing system, portable electronic device, electronic wrist band, electronic head band, portable music player, electronic activity tracking device, pedometer, smartwatch, GPS system, cameras, light level sensors, etc. External devices 850 may be connected to the in-vehicle computing system via communication link 836, which may be wired or wireless, as discussed with reference to communication link 830, and configured to provide two-way communication between the external devices and the in-vehicle computing system. For example, external devices 850 may include one or more sensors and communication link 836 may transmit sensor output from external devices 850 to in-vehicle computing system 809 and touch screen 808. External devices 850 may also store and/or receive information regarding contextual data, user behavior/preferences, etc. and may transmit such information from the external devices 850 to in-vehicle computing system 809 and display 808.

In-vehicle computing system 809 may analyze the input received from external devices 850, mobile device 828, and/or other input sources and select settings for various in-vehicle systems (such as the flicker settings for the display of camera images on display 808), provide output via touch screen 808, communicate with mobile device 828 and/or external devices 850, and/or perform other actions based on the assessment. In some embodiments, all or a portion of the assessment may be performed by the mobile device 828 and/or the external devices 850.

It is to be understood that FIG. 8 depicts one example environment, however the communication systems and methods described herein may be utilized in any suitable environment. Any suitable devices that transmit and/or receive information, sense data, and/or otherwise contribute to an imaging system may be utilized as the systems and/or to perform the methods described herein.

Figure 9:
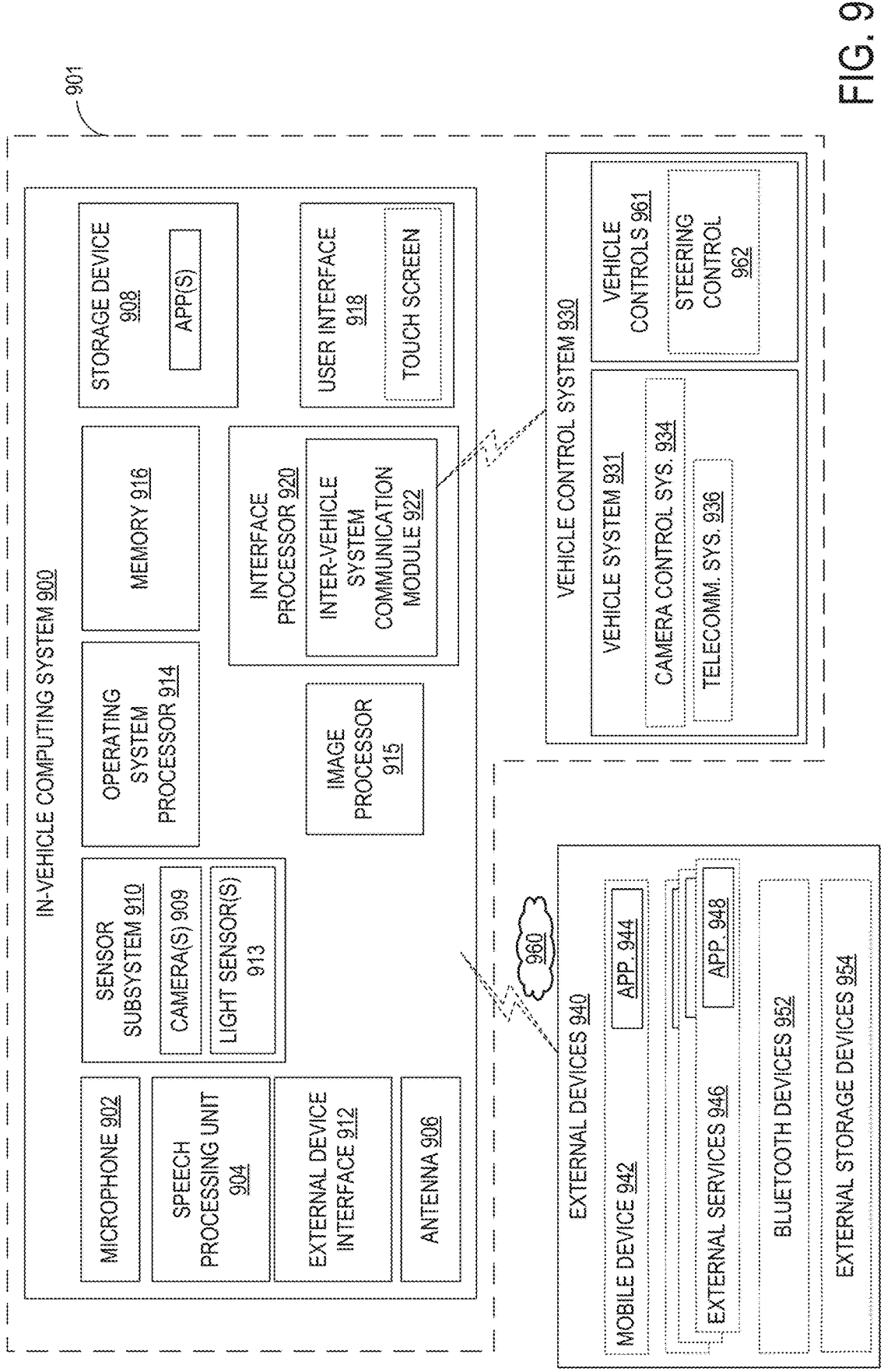
FIG. 9 shows an example in-vehicle computing system in accordance with one or more embodiments of the present disclosure.

FIG. 9 shows a block diagram of an in-vehicle computing system 900 configured and/or integrated inside vehicle 901. In-vehicle computing system 900 may be an example of in-vehicle computing system 809 of FIG. 8 and/or may perform one or more of the methods described herein in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 901 in order to enhance an in-vehicle experience for a driver and/or a passenger.

In-vehicle computing system 900 may include one or more processors including an operating system processor 914, an image processor 915, and an interface processor 920. Operating system processor 914 may execute an operating system on the in-vehicle computing system, and control input/output, display, playback, and other operations of the in-vehicle computing system.

Image processor 915 may apply pre- and post-processing methods to images acquired from cameras 909 mounted to the vehicle 901. The image processor 915 may be a non-limiting example of the processor 214 of FIG. 2 and/or pre-processor 222 of FIG. 2. As discussed in detail with reference to FIGS. 2 and 3, the image processor 915 may pre-process images captured from one or more cameras mounted to the vehicle, when there is glare due to presence of bright light. The image processor 915 may perform one or more of image sharpening, edge detection, thresholding, color augmentation, and object classification via machine learning to help the driver identify objects in the path of the vehicle which would otherwise not be visible due to the presence of bright light. The image processor may additionally utilize an image processing approach as illustrated in FIG. 3 to animate images on the display of the vehicle. In this way, the driver may be able to detect objects in the path in a timely manner, even in the presence of bright obscuring light, as described in FIGS. 10 and 11. In one example, the image processor 915 may be integrated with the operating system processor 914. Interface processor 920 may interface with a vehicle control system 930 via an inter-vehicle system communication module 922.

Inter-vehicle system communication module 922 may output data to other vehicle systems 931 and vehicle control elements 961, while also receiving data input from other vehicle components and systems 931, 961, e.g. by way of vehicle control system 930. When outputting data, inter-vehicle system communication module 922 may provide a signal via a bus corresponding to any status of the vehicle, the vehicle surroundings, or the output of any other information source connected to the vehicle.

A non-volatile storage device 908 may be included in in-vehicle computing system 900 to store data such as instructions executable by processors 914 and 920 in non-volatile form. The storage device 908 may store application data to enable the in-vehicle computing system 900 to run an application for connecting to a cloud-based server and/or collecting information for transmission to the cloud-based server. The application may retrieve information gathered by vehicle systems/sensors, input devices (e.g., user interface 918), devices in communication with the in-vehicle computing system (e.g., a mobile device connected via a Bluetooth link), etc. In-vehicle computing system 900 may further include a volatile memory 916. Volatile memory 916 may be random access memory (RAM). Non-transitory storage devices, such as non-volatile storage device 908 and/or volatile memory 916, may store instructions and/or code that, when executed by a processor (e.g., operating system processor 914 and/or interface processor 920), controls the in-vehicle computing system 900 to perform one or more of the actions described in the disclosure.

A microphone 902 may be included in the in-vehicle computing system 900 to receive voice commands from a user. A speech processing unit 904 may process voice commands, such as the voice commands received from the microphone 902. One or more additional sensors may be included in a sensor subsystem 910 of the in-vehicle computing system 900. For example, the sensor subsystem 910 may include cameras 909, such as a rear-view camera for assisting a user in parking the vehicle and/or a cabin camera for identifying a user (e.g., using facial recognition and/or user gestures) and/or a front-facing camera for detecting objects in a path of the vehicle, and/or one or more side cameras to detect objects in the vicinity of the vehicle. The sensor system 910 may additionally include light sensors 913 mounted to the vehicle. In one example, the light sensor may be mounted externally in close proximity to the cameras 909 to detect light levels at or near the cameras 909. In another example, the light sensors may be mounted on a windshield of the vehicle or near a display in the vehicle, to detect light level at the windshield and/or display. As such, based on the output of the light sensors, the system may determine activate additional image processing, as described further below.

Sensor subsystem 910 of in-vehicle computing system 900 may communicate with and receive inputs from various vehicle sensors and may further receive user inputs. For example, the inputs received by sensor subsystem 910 may include inputs from an audio sensor detecting voice commands issued by a user, a light sensor detecting light directed toward the vehicle (e.g., impinging on a vehicle camera and/or display), a vehicle-mounted camera detecting images in an environment of the vehicle, a motion sensor indicating motion of the vehicle and/or vehicle-mounted cameras, etc. External device interface 912 of in-vehicle computing system 900 may be coupleable to and/or communicate with one or more external devices 940 located external to vehicle 901. While the external devices are illustrated as being located external to vehicle 901, it is to be understood that they may be temporarily housed in vehicle 901, such as when the user is operating the external devices while operating vehicle 901. In other words, the external devices 940 are not integral to vehicle 901. The external devices 940 may include a mobile device 942 (e.g., connected via a Bluetooth connection) or an alternate Bluetooth-enabled device 952. Mobile device 942 may be a mobile phone, smart phone, wearable devices/sensors that may communicate with the in-vehicle computing system via wired and/or wireless communication, or other portable electronic device(s). Other external devices include external services 946. For example, the external devices may include extra-vehicular devices that are separate from and located externally to the vehicle. Still other external devices include external storage devices 954, such as solid-state drives, pen drives, USB drives, etc. External devices 940 may communicate with in-vehicle computing system 900 either wirelessly or via connectors without departing from the scope of this disclosure.

One or more applications 944 may be operable on mobile device 942. As an example, mobile device application 944 may be operated to perform one or more portions of one or more of the methods described herein. Data from the mobile device 942 may be transferred by application 944 to external device interface 912 over network 960. In addition, specific user data requests may be received at mobile device 942 from in-vehicle computing system 900 via the external device interface 912. The specific data requests may include requests for operating a vehicle-mounted camera, requests for processing image data from the vehicle-mounted camera, requests for an amount of ambient light, etc. Mobile device application 944 may send control instructions to components (e.g., microphone, light sensor, vehicle-mounted camera, etc.) or other applications of mobile device 942 to enable the requested data to be collected on the mobile device. Mobile device application 944 may then relay the collected information back to in-vehicle computing system 900.

Likewise, one or more applications 948 may be operable on external services 946. As an example, external services applications 948 may be operated to aggregate and/or analyze data from multiple data sources. For example, external services applications 948 may perform one or more portions of one or more of the methods described herein and transmit associated data and/or control instructions to the in-vehicle computing system 800 and/or related devices (e.g., a vehicle-mounted camera).

Vehicle control system 930 may include controls for controlling aspects of various vehicle systems 931 involved in different in-vehicle functions. These may include, for example, controlling aspects of camera control system 934 for controlling an operation of a vehicle-mounted camera (e.g., controlling one or more cameras to change position, start capturing images, stop capturing images, and/or otherwise controlling the manner in which the one or more cameras capture or transmit images for viewing in the vehicle), as well as aspects of telecommunication system 936 for enabling vehicle occupants to establish telecommunication linkage with other devices.

Control elements positioned on an outside of a vehicle may also be connected to computing system 900, such as via communication module 922. The control elements of the vehicle control system may be physically and permanently positioned on and/or in the vehicle for receiving user input. In addition to receiving control instructions from in-vehicle computing system 900, vehicle control system 930 may also receive input from one or more external devices 940 operated by the user, such as from mobile device 942. This allows aspects of vehicle systems 931 and vehicle controls 961 to be controlled based on user input received from the external devices 940.

In-vehicle computing system 900 may further include one or more antenna(s) 906. The in-vehicle computing system may also receive wireless commands via RF such as via antenna(s) 906 or via infrared or other means through appropriate receiving devices.

One or more elements of the in-vehicle computing system 900 may be controlled by a user via user interface 918. User interface 918 may include a graphical user interface presented on a touch screen and/or user-actuated buttons, switches, knobs, dials, sliders, etc. A user may also interact with one or more applications of the in-vehicle computing system 900 and mobile device 942 via user interface 918. In addition to receiving a user's vehicle setting preferences on user interface 918, vehicle settings selected by in-vehicle control system may be displayed to a user on user interface 918. Images captured by a vehicle-mounted camera (e.g., processed and unprocessed images) may also be displayed to a user on user interface 918.

Figure 10:
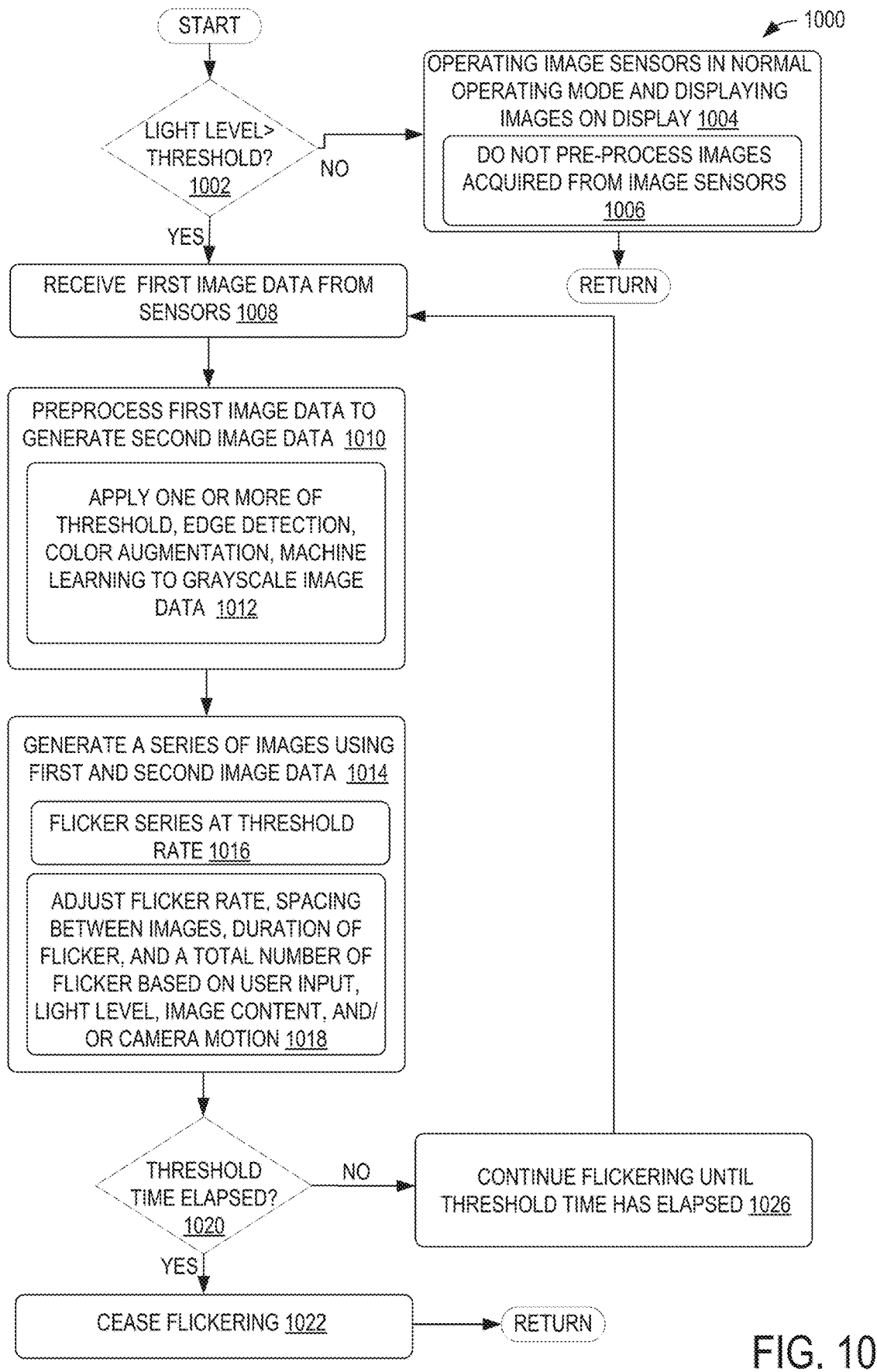
FIG. 10 shows a flow chart of an example method for detecting objects in a path of the vehicle when a light level is above a threshold in accordance with one or more embodiments of the present disclosure.

Turning now to FIG. 10, an example method 1000 for detecting objects in an image acquired in the presence of glare is shown. The image may be acquired using one or more cameras mounted to a vehicle (such as vehicle 702 of FIG. 7 and/or vehicle 802 of FIG. 8 and/or vehicle 901 of FIG. 9). Instructions for carrying out method 1000 and rest of the method 1100 may be executed by a processor (such as processor 214 of FIG. 2 and/or pre-processor 222 of FIG. 2 and/or image processor 915 of FIG. 9) based on instructions stored on a memory of the processor and in conjunction with signals received from light level sensors coupled to the vehicle and a user preference, as described previously with reference to FIGS. 2-3.

Method 1000 begins at 1002 where it is determined if a light level or amount of glare is above a first threshold. As discussed previously with reference to FIG. 7, glares may be caused on images captured using image sensors coupled to the vehicle, when bright sunlight enters the camera lens, for example. The light level at or near the sensor may be measured by a light sensor (such as light sensor 913 of FIG. 9) measuring the amount of light entering the lens of the sensor, for example. If the light level is below the first threshold (e.g., "NO" at 1002), then method 1000 proceeds to 1004 where the one or more image sensors coupled to the vehicle are operated in a normal operating mode. Operating the image sensors in the normal operating mode may include not performing any pre-processing of images acquired using the image sensors at 1006. Thus, objects within the field of view of the image sensor may be visible without the need of additional pre-processing, and the image sensor may be used to obtain images of objects in the path of the vehicle. Herein, the images obtained may be displayed on the display of the vehicle without performing any additional pre-processing (e.g., until such time as the light level increases to above the threshold).

If the light level is above the first threshold (e.g., "YES" at 1002), then method 1000 proceeds to 1008 where method 1000 includes receiving image data from the image sensor. For example, when the vehicle is travelling towards the east in the morning, images acquired from the front-facing camera may have more glare than images acquired using the rear-facing camera. In such an example, the light level at or near the front-facing camera may be higher than the light level at or near the rear-facing camera. As a result, images from the front-facing camera alone may be subject to pre-processing, whereas images acquired from the rear-facing camera may not be subject to pre-processing. Thus, at 1008, image data from the sensor where the light level is found to be higher than the first threshold may be received.

At 1013, method 1000 includes pre-processing the first image data to generate a second image data. Pre-processing the first image data may include transferring the first image from the image generation stage to an image pre-processing stage (stage 2 of FIG. 3). In addition, pre-processing the first image may include applying one or more pre-processing techniques to exaggerate features or objects of the first image at 1012. Some example pre-processing techniques include thresholding, edge detection, color augmenting, object classification via machine learning, and image sharpening, as explained with reference to FIG. 2. The first image may also be referred to as raw or unprocessed image, while the second image may be referred to as an exaggerated or pre-processed image. As an example, the second image may be generated by applying thresholding to the first image. As a result, objects may be more exaggerated in the second image and may additionally have increased contrast, making it easier for the user to identify the objects. Various other techniques may be used to exaggerate features and/or objects detected in the first image.

At 1014, method 1000 includes generating a series of images using the first and the second image data. As shown in FIG. 3, each series may include the exaggerated image followed by the unprocessed image. At 1016, the series may be flashed at a flicker rate on the display of the vehicle. As such, flashing the series of images may be performed at an animation stage (e.g., stage 3 of FIG. 3) of the pre-processor. Flashing the series of images may direct the user's focus towards the exaggerated objects, thereby making it easier for the user to detect the objects even in the presence of glare.

In one example, the flicker rate of flicker may be specified by the user. For example, the user may input a preferred rate of flicker which may be used as the flicker rate of flicker when the images are animated. Flickering the series of images on the display may additionally include adjusting the flicker rate, a spacing between successive images of the series, a duration or persistence of each image in the series, and a total count of flickers based on one or more of the light level detected, a user preference, an image content, and a camera motion at 1018. For example, in response to the light level being higher than a second threshold (wherein the second threshold is higher than the first threshold of 902), the image content being higher than a threshold content, and/or the camera motion being higher than a motion threshold, method 1000 includes performing one or more of increasing the total number, decreasing the spacing, decreasing the flicker rate, and increasing the duration. In this way, parameters such as rate, duration, persistence, and number may be dynamically adjusted to help the user to detect and locate objects in the display even in the presence of glare.

At 1020, method 1000 includes determining if a threshold time has elapsed. In one example, the threshold time may be input by the user. For example, the user may prefer to have the images flicker for 2 sec and accordingly, the threshold time may be set to 2 sec. In another example, the threshold time may be determined based on one or more of the flicker rate, the light level, image content, and camera motion. As an example, if the flicker rate is set to a higher rate, then the threshold time may be reduced. As another example, if the light level is higher than the second threshold, the threshold time may be increased. As yet another example, if the image content is higher than a threshold content level, then the threshold time may be increased. In this way, the threshold time for which the images are animated on the display may be changed according to the parameters used for the animation. In some example embodiments, the threshold time may be adjusted based on a user experience and/or user skill level. For example, there may be learning curve associated with the user detecting objects from images that are flickered on the display. If the user is new to the system, then he/she may take a longer time to detect objects, and consequently, the threshold time may be increased. As the user gets more adept at detecting the objects when images are flickered on the display, the threshold time may be decreased. Thus, as user experience and/or user skill level increases, the threshold time may be decreased.

If the threshold time has not elapsed (e.g., "NO" at 1020), then method 1000 proceeds to 1008 where a first image is reacquired (e.g., to account for changes in the environment/camera position during the preprocessing and flashing), and the images are continued to be flickered on the display until the threshold time is reached. If the threshold time has elapsed (e.g., "YES" at 1020), then method 1000 proceeds to 1022 where the flickering of the images may be ceased. Method 1000 returns. In some example embodiments, even if the threshold time has elapsed at 1020, the method may continue flickering images if the user has not detected the objects and prefers to continue the flickering. In such example embodiments, method 1000 may additionally check if objects are detected by the user (e.g., performing one or more determinations described above with respect to method 1000 at 1018). If a confirmation is received from the user, then the method proceeds to stop the flickering of images, otherwise, the flickering would be continued until the objects in the path of the vehicle are detected by the user.

In this way, by flickering images on the display of the image sensor, objects which would have been normally obscured by the presence of bright light, may be made visible to the user. Thus, the user may be able to quickly detect the objects while he/she is driving the vehicle.

Figure 11:
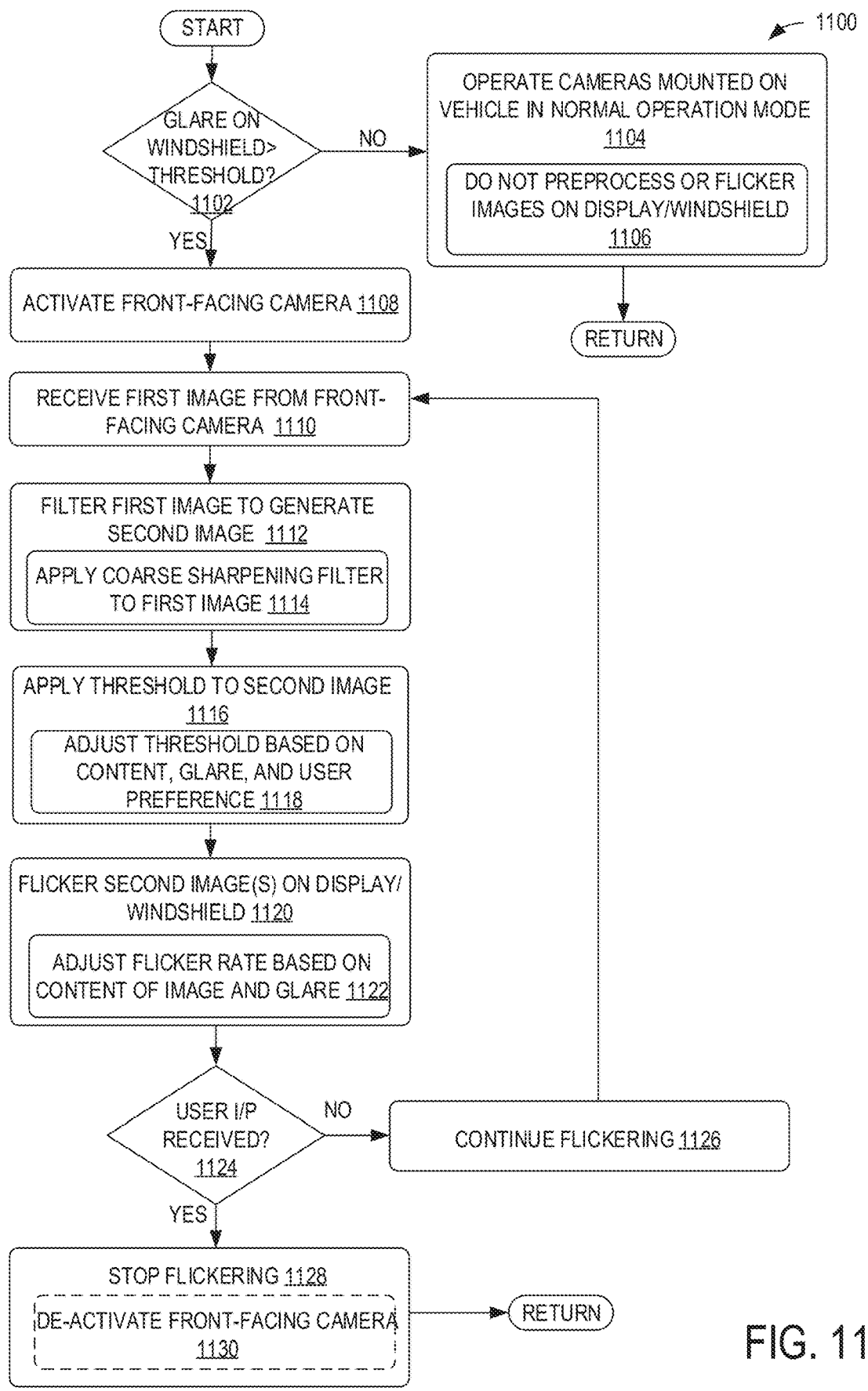
FIG. 11 shows a flow chart of an example method for detecting objects in front of the vehicle when images acquired from a front-facing camera are obscured by bright light.

Turning now to FIG. 11, an example method 1100 for activating a front-facing camera and performing pre-processing on images acquired from the front-facing camera when there is glare on a windshield of a vehicle is shown. The vehicle may be a non-limiting example of vehicle 702 of FIG. 7, vehicle 802 of FIG. 8, and/or vehicle 901 of FIG. 9. For example, in situations where a vehicle is driving towards the sun there may be a glare on the windshield of the vehicle making it difficult for a driver of the vehicle to clearly see objects in the path of the vehicle. This may be further exacerbated when the images are directly displayed on the windshield of the vehicle. The user may not be able to see the objects clearly due to the glare caused by the bright sunlight impinging on the windshield.

Method 1100 begins at 1102 where method 1100 includes determining if a glare or light level reaching the windshield of the vehicle is higher than a threshold. The glare or the light level on the windshield may be determined based on the output of a light sensor coupled to the windshield, for example. If the glare is lower than the threshold (e.g., "NO" at 1102), then method 1100 proceeds to 1104, where cameras mounted to the vehicle may be operated in a normal operating mode at 1104. In one example, the normal operating mode may include integrating images from the one or more cameras mounted to the vehicle to generate a surround view of the vehicle. In another vehicle, the normal operating mode may include generating a view of the rear portion of the vehicle, when the user has activated a rear gear. As such, operating the one or more cameras in the normal operating mode may include not pre-processing the images generated from the cameras and additionally, not flickering the images on the display and/or windshield of the vehicle at 1106.

However, if the glare on the windshield is higher than the threshold (e.g., "YES" at 1102), method 1100 proceeds to 1108, where the front-facing camera of the vehicle may be activated if the front-camera is not already active. At 1110, method 1100 includes receiving a first image from the front-facing camera. Then, at 1112, method 1100 includes filtering the first image to generate a second image. Filtering the first image may include applying a coarse sharpening filter to the first image at 1114. As such, the coarse sharpening is a pre-processing technique that is applied to the first image to remove noise from the first image. The coarse sharpening may additionally emphasize features of objects in image. Thus, objects that may be hard to detect in the first image may be highlighted or emphasized in the second image. In this way, the user's attention may be drawn to the emphasized features of the objects.

At 1116, method 1100 includes applying thresholding to the second image. Applying thresholding to the second image may include applying a threshold to the pixels in the second image. As shown in FIG. 4, the pixels with levels below the threshold may be set to black, and the pixels with levels above the threshold may be set to white, for example. In this way, after applying thresholding to the second image, the resulting image may include increased contrast. In some examples, the threshold applied to the second image may be the median level of the second image or otherwise based on a distribution of brightness in the second image (e.g., prior to applying the thresholding). In addition, the threshold may be adjusted based on a user preference. In some examples, the user may be set the threshold to be applied to the second image.

At 1120, the second, pre-processed image (e.g., including any subsequent pre-processed and/or monochromatic images, such as a black thresholded image and a white thresholded image) may be flickered on the display and/or windshield of the vehicle. As such, the flickering of the images may be performed to enable the user to detect objects in the image more quickly and accurately even in the presence of glare. In addition, a flicker rate may be adjusted based on one or more of the image content and the glare at 1122. As described previously, the images may be flickered at the flicker rate that may be set based on a user preference. In addition, the flicker rate may be adjusted based on the amount of glare and the image content. As the image content increases, the flicker rate may be decreased. Likewise, as the light level or amount of glare increases, the flicker rate may be decreased. In this way, the flicker rate may be dynamically adjusted based on the image content and the amount of glare present.

At 1124, method 1100 includes checking if a user input received. In one example, the user input may indicate if objects have been detected based on the images flickered on the display and/or windshield. In another example, the user input may be indicative of whether the user wishes to stop the flickering. For example, if the user input is received (e.g., "YES" at 1124), then the imaging system may determine that the user wishes to stop the flickering, and accordingly method 1100 proceeds to 1128. However, if user input is not received (e.g., "NO" at 1124), then the imaging system may determine that the user wishes to continue flickering the images, and accordingly, method 1100 proceeds to 1126 wherein the flickering is continued, and method returns to 1110 to acquire an updated image of the environment (which may change as the vehicle is traveling).

At 1128, method 1100 includes stopping or ceasing the flickering of images on the display and/or windshield. In some examples, stopping the flickering may optionally include de-activating the front-facing camera at 1130. In this way, objects in front of the vehicle which would otherwise not be visible to the user due to a glare at the windshield may be exaggerated and animated.

The technical effect of animating or flickering the exaggerated image and the unprocessed image is that user's attention may be focused to the flashing images, and hence objects may be detected more accurately. In this way, the user may capture fewer degraded images (e.g., images with undesirable composition due to glare), thereby increasing the overall efficiency of the imaging system. The disclosure provides for a method including, during a first operating condition of an image sensor, preprocessing image data acquired from the image sensor and flickering a series of images generated from image data for a threshold time, and stopping the flickering after the threshold time has elapsed, and, during a second operating condition of the image sensor, displaying image acquired by the image data without any flicker, the first operating condition and the second operating condition determined based on a light level at the image sensor.

The disclosure also provides for a method for capturing images with an imaging system, the method including, during an image composition process for capturing an image of an object using an image sensor of the imaging system, and responsive to an indication that an intensity of glare light interfering with the imaging system is higher than a threshold, acquiring a first image using the image sensor, converting the first image into at least a second image, the second image including an intensity-adjusted version of the first image, intermittently displaying images including the first image and at least the second image on a display of the imaging system, and ceasing the intermittent displaying of the images. In a first example of the method, the first image may additionally or alternatively be acquired using the image sensor, and the second image may additionally or alternatively be generated by performing preprocessing on the first image to adjust one or more of an intensity and a hue of pixels across an entirety of the first image that is displayed. A second example of the method optionally includes the first example, and further includes the method, wherein the converting further includes generating the second image by applying a coarse sharpening filter to the first image to generate the second image and the method further comprising applying one or more of a white thresholding, a black thresholding, an edge detection, and a color augmenting on the second image. A third example of the method optionally includes one or both of the first and second examples, and further includes the method, wherein intermittently displaying images includes intermittently displaying the first image, the second image, and at least a third image, where the third image is generated by performing preprocessing on the first image to form a different image than the second image. A fourth example of the method optionally includes one or more of the first through the third examples, and further includes the method, wherein the third image is an inverse of the second image. A fifth example of the method optionally includes one or more of the first through the fourth examples, and further includes the method, wherein displaying the images including the first image and at least the second image includes displaying a series of images including the first image and at least the second image, the method further comprising displaying the series at a flicker rate, the flicker rate adjusted based on one or more of an amount of the glare affecting the visibility of the first image, a content of the first image, and a motion of the imaging system. A sixth example of the method optionally includes one or more of the first through the fifth examples, and further includes adjusting one or more of a duration between images of the series, a persistence of each image of the series, and a number of times the series is flashed based on one or more of the amount of the glare, the content of the first image, and the motion of the imaging system. A seventh example of the method optionally includes one or more of the first through the sixth examples, and further includes the method, wherein the adjusting includes performing one or more of increasing the number, decreasing the duration, decreasing the flicker rate, and increasing the persistence responsive to one or more of the amount of the glare being higher than a second threshold, the motion of the imaging system being higher than a motion threshold, and the content of the first image being higher than a content threshold. An eighth example of the method optionally includes one or more of the first through the seventh examples, and further includes adjusting one or more of the duration, the persistence, the flicker rate, and the number based on one or more of a user preference and a user skill level. A ninth example of the method optionally includes one or more of the first through the eighth examples, and further includes ceasing the intermittent displaying of the images responsive to a user input.

The disclosure also provides for an imaging system including an image sensor configured to image an environment of the imaging system, a display, a processor, and a storage device storing instructions executable by the processor to, responsive to receiving an indication that a light intensity associated with one or more of the image sensor and the display is higher than or equal to a threshold, receive first image data from the image sensor, preprocess the first image data to generate at least second image data, generate a series of images using the first image data and at least the second image data, intermittently display the series of images for a threshold time on the display, and cease the intermittent display responsive to a termination trigger, and, responsive to an indication that the light intensity is lower than the threshold, receive the first image data from the image sensor, and display the first image data on the display without preprocessing the first image data. In a first example of the imaging system, generating the second image data may additionally or alternatively include applying a coarse sharpening filter to the first image data and further applying one or more of a threshold, an edge detection, color augmentation, and object classification via machine learning to the first image data. A second example of the imaging system optionally includes the first example, and further includes one or more light sensors configured to estimate the light intensity incident on one or more of the image sensor and the display, and the imaging system wherein the instructions are further executable to intermittently display the series of images at a flicker rate, the flicker rate adaptively adjusted based on one or more of a user input, the light intensity, a content of the images, and a motion of the image sensor. A third example of the imaging system optionally includes one or both of the first and the second examples, and further includes the imaging system, wherein intermittently displaying further includes adjusting one or more of a spacing between successive images in the series, a duration of flicker of each image of the series, and a total number of flickers of images of the series based on one or more of a user input, the light intensity, the content of the first image data, and the motion of the image sensor. A fourth example of the imaging system optionally includes one or more of the first through the third examples, and further includes the imaging system, wherein the termination trigger includes one or more of a user input and a determination that the series of images have been intermittently displayed for a threshold amount of time.

The disclosure also provides for an in-vehicle computing system of a vehicle, the in-vehicle computing system including a display, a camera interface communicatively coupled to at least one camera mounted on the vehicle, a sensor interface communicatively coupled to a light sensor, a processor, and a storage device storing instructions executable by the processor to detect, based on data received from the light sensor, a light intensity in a vicinity of the vehicle being higher than a threshold, and, responsive to detecting the light intensity being higher than the threshold, receive a first image from the at least one camera, adjust one or more of a color distribution and a light intensity distribution of the first image to generate at least a second image, and intermittently flicker the first image and the second image on the display. In a first example of the in-vehicle computing system, the filter may additionally or alternatively include applying a coarse sharpening filter to the first image to generate the second image. A second example of the in-vehicle computing system optionally includes the first example, and further includes the in-vehicle computing system, wherein the instructions are further executable to apply a threshold to the second image, and adjust the threshold based on one or more of a content of the first image, an amount of the light intensity, a user preference, and a motion of the at least one camera. A third example of the in-vehicle computing system optionally includes one or both of the first and the second examples, and further includes the in-vehicle computing system, wherein the instructions are further executable to adjust the flicker based on one or more of the content of the first image and an amount the glare. A fourth example of the in-vehicle computing system optionally includes one or more of the first through the third examples, and further includes the in-vehicle computing system, wherein the instructions are further executable to stop flickering the first image and the second image in response to receiving an input from a user.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the imaging system 110 of FIG. 1, the image sensor 202 of FIG. 2, the in-vehicle computing system 809 described with reference to FIG. 8, and/or in-vehicle computing system 900 described with reference to FIG. 9. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:
1. A method for capturing images with an imaging system, the method comprising:
   during an image composition process for capturing an image of an object using an image sensor of the imaging system, and responsive to an indication that an intensity of glare light interfering with the imaging system is higher than a threshold:
      acquiring a first image using the image sensor;
      converting the first image into at least a second image, the second image including an intensity-adjusted version of the first image;
      intermittently flickering display of the first image and at least the second image on a display of the imaging system, a rate of the flicker based on a detected light level; and
      ceasing the intermittent display of the images.

2. The method of claim 1, wherein the first image is acquired using the image sensor, and wherein the second image is generated by performing preprocessing on the first image to adjust one or more of an intensity and a hue of pixels across an entirety of the first image that is displayed.

3. The method of claim 1, wherein the converting further includes generating the second image by applying a coarse sharpening filter to the first image to generate the second image and the method further comprising applying one or more of a white thresholding, a black thresholding, an edge detection, and a color augmenting on the second image.

4. The method of claim 1, wherein the intermittently flickering display of the first image and at least the second image includes intermittently displaying the first image, the second image, and at least a third image, where the third image is generated by performing preprocessing on the first image to form a different image than the second image.

5. The method of claim 4, wherein the third image is an inverse of the second image.

6. The method of claim 1, wherein the intermittently flickering display of the first image and at least the second image includes displaying a series of images including the first image and at least the second image, the method further comprising the rate of the flicker further being adjusted based on one or more of an amount of the glare affecting a visibility of the first image, a content of the first image, and a motion of the imaging system.

7. The method of claim 6, further comprising adjusting one or more of a duration between images of the series, a persistence of each image of the series, and a number of times the series is flashed based on one or more of the amount of the glare, the content of the first image, and the motion of the imaging system.

8. The method of claim 7, wherein the adjusting includes performing one or more of increasing the number, decreasing the duration, decreasing the flicker rate, and increasing the persistence responsive to one or more of the amount of the glare being higher than a second threshold, the motion of the imaging system being higher than a motion threshold, and the content of the first image being higher than a content threshold.

9. The method of claim 7, further comprising adjusting one or more of the duration, the persistence, the flicker rate, and the number based on one or more of a user preference and a user skill level.

10. The method of claim 1, further comprising ceasing the intermittent displaying of the images responsive to a user input.

11. An imaging system comprising:
an image sensor configured to image an environment of the imaging system;
one or more light sensors;
a display;
a processor; and
a storage device storing instructions executable by the processor to:
  responsive to receiving an indication that a light intensity associated with the display is higher than or equal to a threshold:
    receive first image data from the image sensor,
    preprocess the first image data to generate at least second image data,
    generate a series of images using the first image data and at least the second image data,
    intermittently flickering display of the series of images for a threshold time on the display, wherein a rate of the flicker is adjusted based on a light level, the light level determined based on an output of the one or more light sensors, and
    cease the intermittent flickering display responsive to a termination trigger; and
  responsive to an indication that the light intensity is lower than the threshold:
    receive the first image data from the image sensor, and
    display the first image data on the display without preprocessing the first image data.

12. The imaging system of claim 11, wherein generating the second image data includes applying a coarse sharpening filter to the first image data and further applying one or more of a threshold, an edge detection, color augmentation, and object classification via machine learning to the first image data.

13. The imaging system of claim 12, wherein the one or more light sensors are configured to estimate the light intensity incident on the display, and wherein the rate of the flicker is further adaptively adjusted based on a user input, a content of the images, and a motion of the image sensor.

14. The imaging system of claim 13, wherein intermittently flickering display of the series of images further includes adjusting one or more of a spacing between successive images in the series, a duration of flicker of each image of the series, and a total number of flickers of images of the series based on one or more of a user input, the light intensity, the content of the first image data, and the motion of the image sensor.

15. The imaging system of claim 11, wherein the termination trigger includes one or more of a user input and a determination that the series of images have been intermittently displayed for a threshold amount of time.

16. An in-vehicle computing system of a vehicle, the in-vehicle computing system comprising:
a display;
a camera interface communicatively coupled to at least one camera mounted on the vehicle;
a sensor interface communicatively coupled to a light sensor;
a processor; and
a storage device storing instructions executable by the processor to:
  detect, based on data received from the light sensor, a light intensity in a vicinity of the vehicle being higher than a threshold, and
  responsive to detecting the light intensity being higher than the threshold:
    receive a first image from the at least one camera;
    adjust one or more of a color distribution and a light intensity distribution of the first image to generate at least a second image; and
    intermittently flicker the first image and the second image on the display, wherein a rate of the flicker is adjusted based on a light level, the light level determined based on an output of the light sensor.

17. The in-vehicle computing system of claim 16, wherein generating the second image further includes applying a coarse sharpening filter to the first image to generate the second image.

18. The in-vehicle computing system of claim 16, wherein the instructions are further executable to apply a threshold to pixels of the second image to increase a contrast of the second image, and adjust the threshold based on one or more of a content of the first image, an amount of the light intensity, a user preference, and a motion of the at least one camera.

19. The in-vehicle computing system of claim 18, wherein the instructions are further executable to adjust the flicker based on one or more of the content of the first image and an amount of glare.

20. The in-vehicle computing system of claim 16, wherein the instructions are further executable to stop flickering the first image and the second image in response to receiving an input from a user.

* * * * *